United States Patent
Hair, III et al.

(10) Patent No.: US 7,015,798 B2
(45) Date of Patent: Mar. 21, 2006

(54) METHOD AND SYSTEM FOR BIDIRECTIONAL DATA AND POWER TRANSMISSION

(75) Inventors: James M. Hair, III, Cheyenne, WY (US); Daniel L. Greene, Cheyenne, WY (US)

(73) Assignee: Abet Technologies, LLC, Evanston, IL (US)

(*) Notice: Subject to any disclaimer, the term of this patent is extended or adjusted under 35 U.S.C. 154(b) by 0 days.

(21) Appl. No.: 11/136,581

(22) Filed: May 23, 2005

(65) Prior Publication Data

US 2005/0231355 A1   Oct. 20, 2005

Related U.S. Application Data

(62) Division of application No. 10/607,230, filed on Jun. 26, 2003, now Pat. No. 6,906,618.

(51) Int. Cl.
H04M 11/04 (2006.01)

(52) U.S. Cl. .............. 340/310.16; 340/310.18; 340/538.15

(58) Field of Classification Search .......... 340/310.01, 340/310.06, 310.08, 310.16, 310.18, 538.15; 375/257, 259, 219
See application file for complete search history.

(56) References Cited

U.S. PATENT DOCUMENTS

| | | | |
|---|---|---|---|
| 4,463,341 A | 7/1984 | Iwasaki | |
| 4,477,896 A * | 10/1984 | Aker | 370/201 |
| 4,734,919 A | 3/1988 | Tae | |
| 5,083,067 A | 1/1992 | Soushin et al. | |
| 5,305,316 A | 4/1994 | Yoshida et al. | |
| 5,381,553 A | 1/1995 | Nishimura et al. | |
| 5,469,150 A | 11/1995 | Sitte | |
| 5,479,124 A * | 12/1995 | Pun et al. | 327/108 |
| 5,483,230 A | 1/1996 | Mueller | |
| 5,525,962 A * | 6/1996 | Tice | 340/506 |
| 5,589,813 A | 12/1996 | Nielsen | |
| 5,657,324 A * | 8/1997 | Itkin | 370/276 |
| 5,745,027 A | 4/1998 | Malville | |
| 5,859,584 A | 1/1999 | Counsell et al. | |
| 6,115,831 A | 9/2000 | Hanf et al. | |
| 6,147,963 A | 11/2000 | Walker et al. | |
| 6,188,314 B1 | 2/2001 | Wallace et al. | |
| 6,363,066 B1 | 3/2002 | Frimodig | |
| 6,396,391 B1 | 5/2002 | Binder | |
| 6,438,462 B1 | 8/2002 | Hanf et al. | |
| 6,459,175 B1 | 10/2002 | Potega | |
| 6,473,608 B1 | 10/2002 | Lehr et al. | |
| 6,477,457 B1 | 11/2002 | Fendt et al. | |
| 2002/0037054 A1 | 3/2002 | Schurig | |
| 2002/0126574 A1 | 9/2002 | Downey, Jr. et al. | |
| 2002/0130643 A1 | 9/2002 | Binder et al. | |

(Continued)

FOREIGN PATENT DOCUMENTS

AU    733334 B1    5/2001

(Continued)

Primary Examiner—Toan N. Pham
(74) Attorney, Agent, or Firm—Gardner Carton & Douglas LLP

(57) ABSTRACT

A method and system for bidirectional data and power transmission are shown and described. An exemplary embodiment comprises a current receiver, including a microprocessor and a driver, and a plurality of nodes connected to the current receiver through a plurality of wires that allow both power supply and bidirectional data transfer between the current receiver and the plurality of nodes. The use of the plurality of wires for both power and data transmission offers significant advantages over the prior art in terms of weight reduction and system modularity.

20 Claims, 15 Drawing Sheets

U.S. PATENT DOCUMENTS

2002/0150116 A1   10/2002   Huang

FOREIGN PATENT DOCUMENTS

| EP | 0 522 179 A1 | 1/1993 |
|---|---|---|
| JP | 6-205596 A | 7/1994 |
| JP | 10-84372 A | 3/1998 |
| JP | 10-303952 A | 11/1998 |
| WO | WO 02/051668 A1 | 7/2002 |

* cited by examiner

METHOD AND SYSTEM FOR BIDIRECTIONAL DATA AND POWER TRANSMISSION

CROSS-REFERENCE TO RELATED PATENT APPLICATIONS

This application is a divisional of U.S. patent application Ser. No. 10/607,230, filed Jun. 26, 2003, now U.S. Pat. No. 6,906,618.

FIELD OF THE INVENTION

This invention generally relates to methods and systems for distributing electrical power and data. In particular, the invention relates to a method and system for transmitting power and data using a single set of wires.

BACKGROUND OF THE INVENTION

Microprocessors are found in almost every electronic device that we use in our day-to-day lives. One important application of microprocessors has been in the control of electronic devices installed in vehicles, including automobiles, buses, and airplanes. In the past, many critical automobile functions have been accomplished mechanically. Automobile functions such as like wheel differential adjustments and engine timing are now controlled using sensors and actuators electrically connected to microprocessors.

Microprocessors provide well-known advantages, including making diagnostics and repairs easier in complicated machines. Microprocessors have also been used to improve the efficiency of machines when used with sensors and actuators in a feedback loop, obtaining more efficient modes of operation. There are, however, some disadvantages to the use of microprocessors.

A look under the hood of a newer automobile may be enough to see one disadvantage to microprocessor use: before microprocessors became small enough and reliable enough to be installed in automobiles, it was possible to see how separate engine parts were connected, and even to see the road underneath. Nowadays engine parts are covered by wires and cables that run from sensors and actuators attached to the mechanical parts to microprocessors used for control. Extra wires and cables are disadvantageous: every extra wire installed consumes power and adds weight. More wires also make maintenance harder.

Unfortunately, it has been largely impossible for wires to be eliminated from most microprocessor system designs. Conventionally, a separate wire has been required for power, ground, and each of a plurality of data transmission lines between a microprocessor and one or more sensors or actuators attached thereto.

There is, therefore, a need for a method and system that can eliminate extra wiring used in power and data systems.

BRIEF SUMMARY OF THE INVENTION

The present invention meets the foregoing need with a method and system that provide both power and bidirectional data transmission through a single set of wires (usually, a single pair). In an embodiment, the present invention uses a high-speed power transistor bridge to provide power and send control signals from a controller to a node by switching voltage polarity. The node may then respond with response signals using an active current sink. The response signals are received by a sensitive current receiver circuit at the controller. Both the controller and the node use microprocessors for processing the signals sent and received.

In a first embodiment, the present invention comprises a system that includes a pair of wires, a power source adapted to supply a DC voltage, a controller, and a plurality of nodes. The pair of wires is used to connect the controller to the plurality of nodes, providing both power and bidirectional data transmission for the nodes. In this embodiment, the controller includes a controller microprocessor, a current sensor, and a current receiver circuit. Each node includes an active current sink, a node microprocessor, and a load, which may be either a sensor or an actuator.

Although in low voltage and power applications it is possible to build a controller capable of sending signals from the controller to the nodes by connecting the controller microprocessor directly to the set of wires, in an embodiment of the present invention, the controller sends signals to the nodes using a driver comprising a power transistor bridge. The controller microprocessor is connected to the driver through switches, buffers, and bridge drivers that condition voltage control signals from the controller microprocessor for supply to the power transistor bridge. The power transistor bridge is thus capable of switching the voltage polarity from the power source on the set of wires in response to different voltage control signals from the controller microprocessor, as described in the section entitled DETAILED DESCRIPTION OF THE INVENTION, below.

In an embodiment, power is received at each node through a full-wave rectifier (in an embodiment, a diode bridge) and a passive filter. The passive filter components are selected to match the sensor or actuator load on the node, but may in some embodiments be a simple capacitor. Each node also includes a node microprocessor that, in an embodiment, receives voltage polarity reversal signals from the controller through a bipolar transistor switch. The node microprocessor sends signals through the set of wires (and hence, eventually to the controller) through a digital output connected to an active current sink. In an embodiment, the active current sink includes a combination of bipolar and field-effect transistors.

The controller also includes, in an embodiment, a current sensor and a current receiver circuit for detecting signals sent from the node to the controller. The current sensor may be either a low impedance resistor or a hall sensor, with the current receiver circuit including an integrator, diode network, and comparator. In some embodiments, an analog gate controlled by the controller microprocessor is used instead of a diode network. The current sensor and current receiver circuit together are capable of detecting signals from the node and supplying a corresponding digital signal to the controller microprocessor.

The present invention may be implemented in a variety of environments, including passenger vehicles (such as automobiles, motorcycles, or buses), aircraft (such as commercial or military airplanes, helicopters, or rockets), and buildings (such as homes or offices). The versatility and modularity of the invention provides an advantage over the prior art, since an installation in a different environment requires few aspects of the system to be redesigned for installation in the different environment.

The present invention also includes a method for supplying power and sending data back and forth between a controller and a node. In an embodiment, power from a DC voltage power source is supplied to the nodes through a set of wires. Data is sent from the controller to the node by switching the polarity of the DC voltage on the set of wires, and data is sent from the node to the controller by actively sinking current on the set of wires. The data is processed using microprocessors connected to the controller and the node. In an embodiment, the method uses a protocol specially adapted for use with the system of the present invention.

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE INVENTION

The present invention generally provides a lighter, lower power, robust, and easy to maintain method and system for transmitting power and bidirectional data between a central unit (the "controller") and a plurality of nodes, which are connected to either sensor or actuator "loads." The present invention requires only two wires for connecting the controller to the plurality of nodes, although more than two wires could be used if so desired. Both power and data are sent simultaneously through the two wires. Power is provided as a DC voltage difference. Data is sent in a first direction (from the controller to one of the plurality of nodes) by switching the polarity of the DC voltage, and in a second direction (from one of the plurality of nodes to the controller) by actively sinking current at the node.

As is known to those of skill in the art, sensors include any electronic device capable of generating a signal corresponding to a measurement of a physical state. For example, in an automobile, sensors might include speedometers, odometers, thermostats, fuel and oil gauges, or battery meters. Actuators include any electronic device capable of receiving a signal and changing a physical state in response. In an automobile, actuators include, for example, headlamps, windshield wipers, climate controls, window motors, door locks, or fuel injection controls. Sensors are used to generate an electronic signal from a physical state; actuators are used to change a physical state using an electronic signal.

Figure 1:
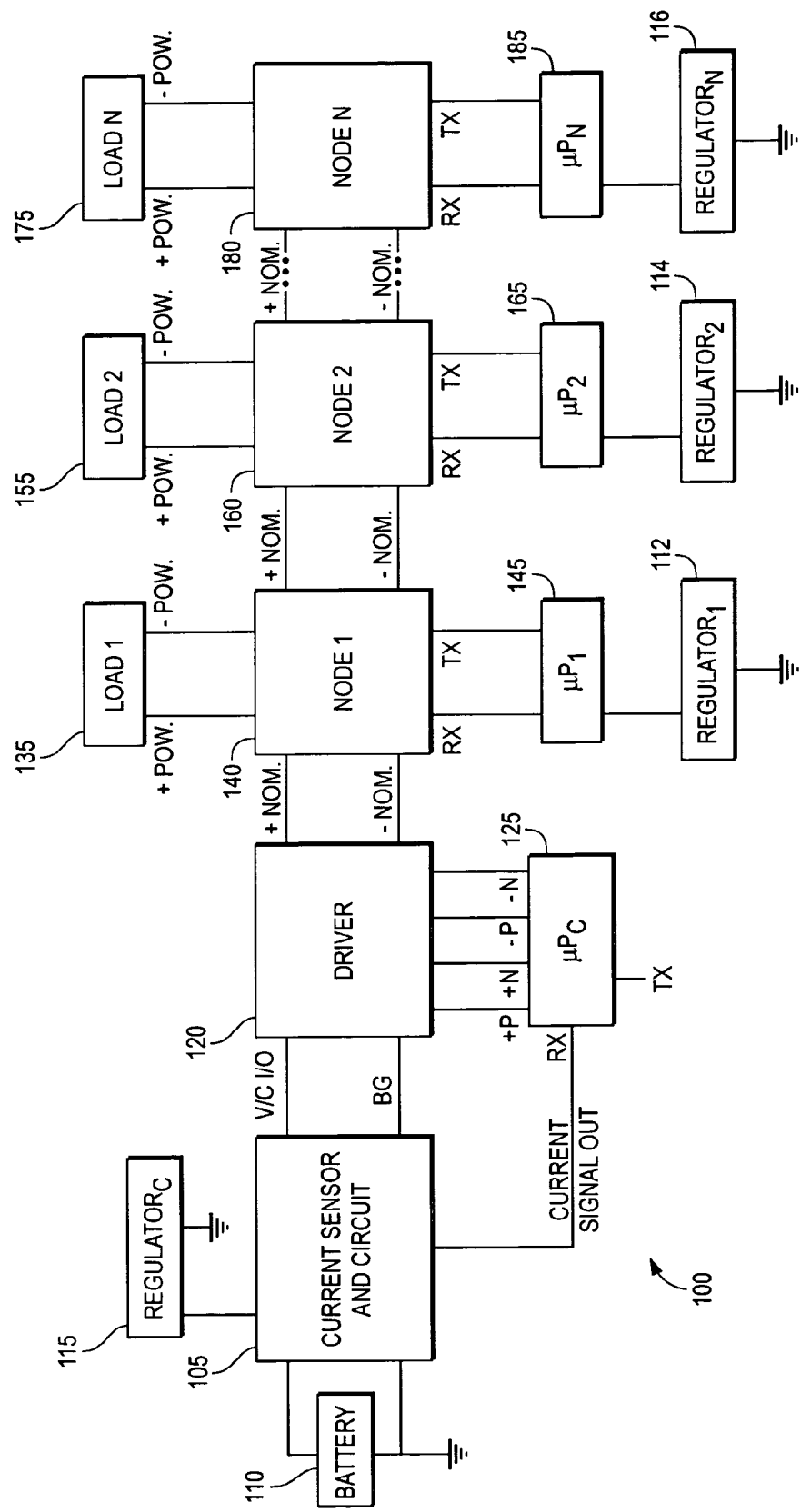
FIG. 1 shows a block diagram of a complete system, in accordance with an embodiment of the present invention.

An embodiment of a complete power and bidirectional data transmission system 100 is shown in FIG. 1 as a block diagram. The system 100 includes a battery 110 as a power source, a current sensor and current receiver circuit 105, a controller microprocessor 125, and a driver 120. A voltage/current input/output ("V/C I/O") line and battery ground ("BG") line connect the current sensor and current receiver circuit 105 and the driver 120. In the embodiment shown in FIG. 1, what is herein referred to as "the controller" includes the combination of controller microprocessor 125, current sensor and current receiver circuit 105, and (optionally) driver 120.

Although a battery 110 is shown as the power source in the embodiment of FIG. 1, in various other embodiments of the present invention the power source may be an electrochemical cell or fuel cell, although an AC voltage supply, transformer, and rectifier could also be used. In an embodiment of the present invention in which the system is installed in a passenger vehicle, such as an automobile, motorcycle, or bus, the power source would generally be an electrochemical cell (i.e., a battery). In an embodiment of the present invention that is installed in a building, such as an office or home, an AC voltage supply, transformer, and rectifier might be used as the power source.

In addition to acting as a conditioner for the power source, in an embodiment the controller provides central coordination of all data transmitted within the system: any data transmitted on the set of wires passes through the controller, including any data intended only for transfer from a first node to a second node. Advantageously, this logical architecture for data transmission with the system of the present invention allows for a more robust system; data transmission within the system is possible regardless of how many nodes have been disabled or destroyed.

The controller microprocessor 125 provides central intelligence for the entire system 100. In the embodiment of FIG. 1, which may be installed in a passenger vehicle, the transmit line ("Tx") of the controller microprocessor 125 is shown disconnected and the receive line ("Rx") is shown connected to the current sensor and current receiver circuit 105. In a different embodiment, both Tx and Rx might be connected to the current sensor and current receiver circuit 105. In still another embodiment, the Tx line might be connected to the driver 120 while the Rx line is connected to the current receiver circuit 105. Also in the embodiment of FIG. 1, the digital output lines ("+P", "–P", "+N", and "–N") of the controller microprocessor 125 are connected directly to the driver 120 for use in controlling the voltage polarity on the pair of positive and negative nominal lines ("+NOM" and "–NOM") that run from the driver 120 to the plurality of nodes 1 through N: represented as the sequence of Node 1 (140), Node 2 (160), and Node N (180).

Nodes (140, 160, and 180) are used for direct control of measurements and changes to physical states carried out by the sensor and actuator loads (135, 155, and 175) connected to the system 100. In the embodiment of FIG. 1, the plurality of nodes (1 through N) 140, 160, and 180 is connected to driver 120 in serial along the set of wires +NOM and –NOM. In turn, the nodes 140, 160, and 180 are connected by positive and negative power lines ("+POW" and "–POW") to loads 135, 155, and 175, respectively, which may be sensors or actuators as is necessary for a particular installation. The last node 180 is denoted node "N" because, in accordance with various embodiments of the present invention, the number of nodes "N" could be fewer than ten, as many as several hundred, or more. Finally, as shown in FIG. 1, the nodes 140, 160, and 180 are also connected by receive and transmit lines ("Rx" and "Tx") to node microprocessors 145, 165, and 185, respectively.

Although not strictly necessary for the present invention, FIG. 1 also shows regulators 115, 112, 114, and 116 connected to both the current sensor and current receiver circuit 105 and to each of the nodes. The regulators provide a stable reference voltage and a source of power for low power usage—for example, for powering the digital logic of the controller and node microprocessors (125, 145, 165, and 185).

The current sensor and current receiver circuit 105 is adapted to receive signals generated by sinking of current at a node. Presently, four different embodiments of a current sensor and current receiver circuit 105 are contemplated for use in the present invention. In two embodiments shown in FIGS. 2A and 2C, a low impedance resistor 215 is used as a current sensor in the circuits 200 and 250. In another two embodiments shown in FIGS. 2B and 2D, a hall sensor 255 is used as a current sensor in the circuit 225 and 275.

Figure 2A:
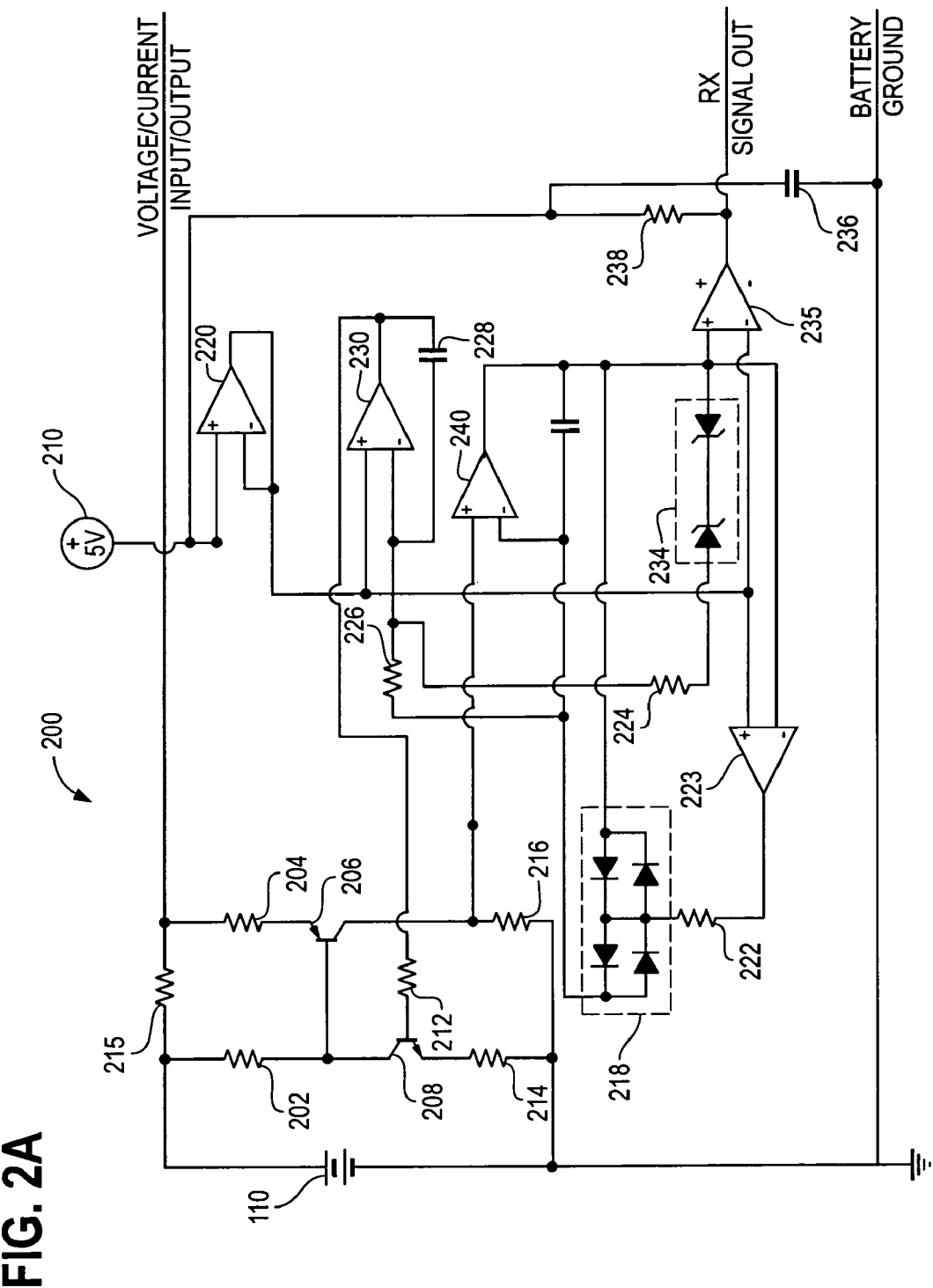
FIG. 2A shows a circuit diagram of a power source, a current sensor, and a current receiver circuit including a diode network, in accordance with an embodiment of the present invention in which a low impedance resistor is used as a current sensor.

The circuit 200 shown in FIG. 2A includes a power source 110 and a five-volt regulator 210, in addition to the low impedance resistor 215. An embodiment of the current receiver circuit is connected in parallel across the resistor 215. In this embodiment, the low impedance current sensing resistor 215 might be about 0.05 Ohm. As shown, the low impedance resistor 215 is in series with the power source 110 and the V/C I/O line, which runs to the driver 120 (not shown in FIG. 2A).

When the circuit 200 is in operation, a change in current with time on the V/C I/O line causes a voltage drop across the low impedance resistor 215. The voltage drop is transferred through gain resistor 204 and compensation resistor 202 to the base and emitter of bipolar transistor 206. The network of transistors 206 and 208 acts as a signal amplifier in this embodiment of the current receiver circuit. The collector of transistor 206 is connected through gain control resistor 216 to the power source ground (or "battery ground"). The amplified signal at the collector of transistor 206, which has a nominal +5V voltage, is supplied to the positive input of operational amplifier ("op-amp") 240. A diode biasing network 218, integration resistor 226, and op-amp integrator 230 are connected to the negative input of op-amp 240, with resistor 226 and capacitor 228 forming the integration network for the op-amp integrator 230. The op-amp voltage follower 220 is connected to the five-volt regulator 210, and acts as a voltage bias stabilization source for the circuit 200. Two op-amp comparators 223 and 235 are used in circuit 200. The comparator 223 also acts as a bias driver for the diode biasing network 218. The output of comparator 235 serves as an Rx line for supply to the controller microprocessor 125 (not shown in FIG. 2A).

Figure 2B:
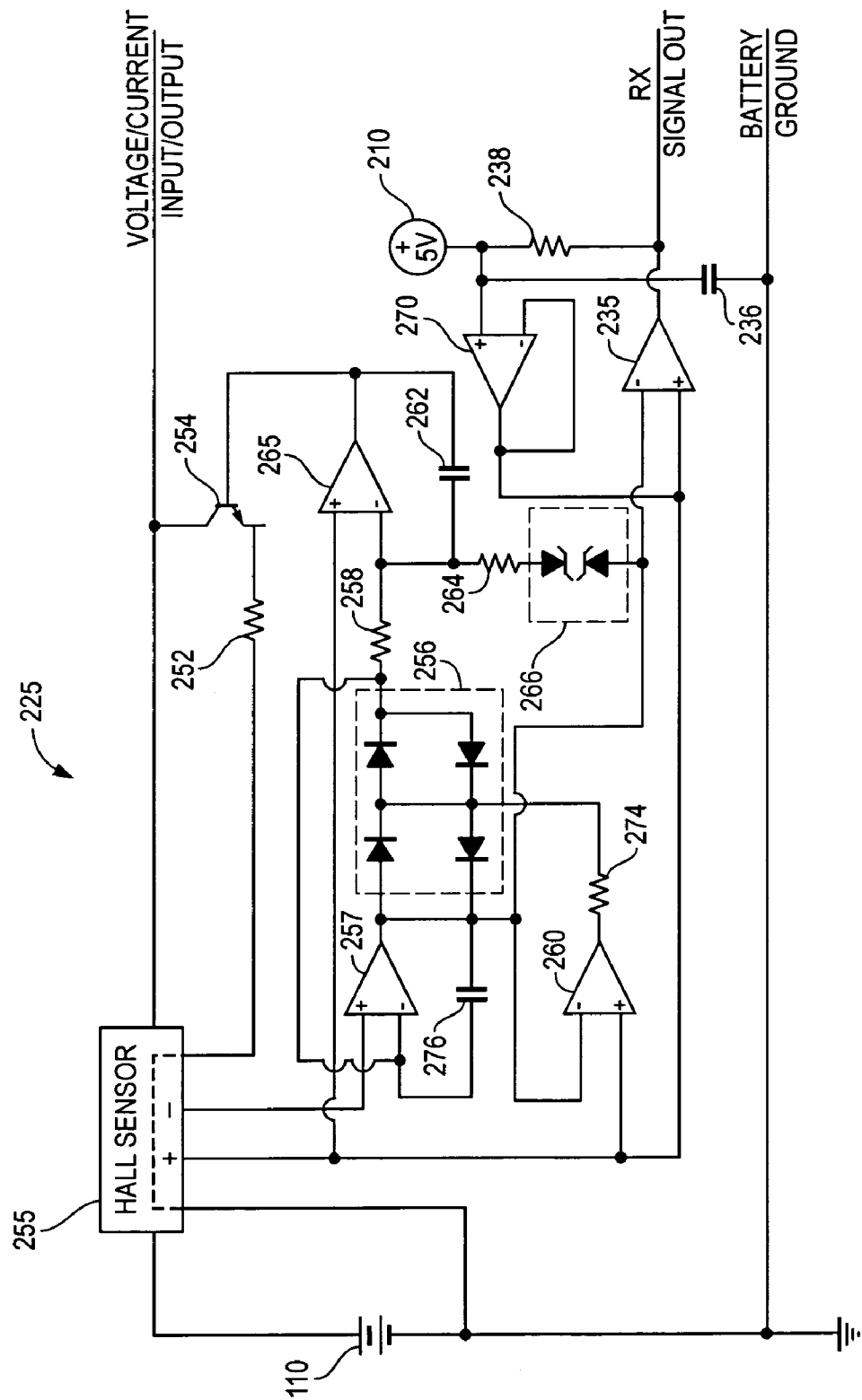
FIG. 2B shows a circuit diagram of a power source, a current sensor, and a current receiver circuit including a diode network, in accordance with an embodiment of the present invention in which a hall sensor is used as a current sensor.
Figure 2C:
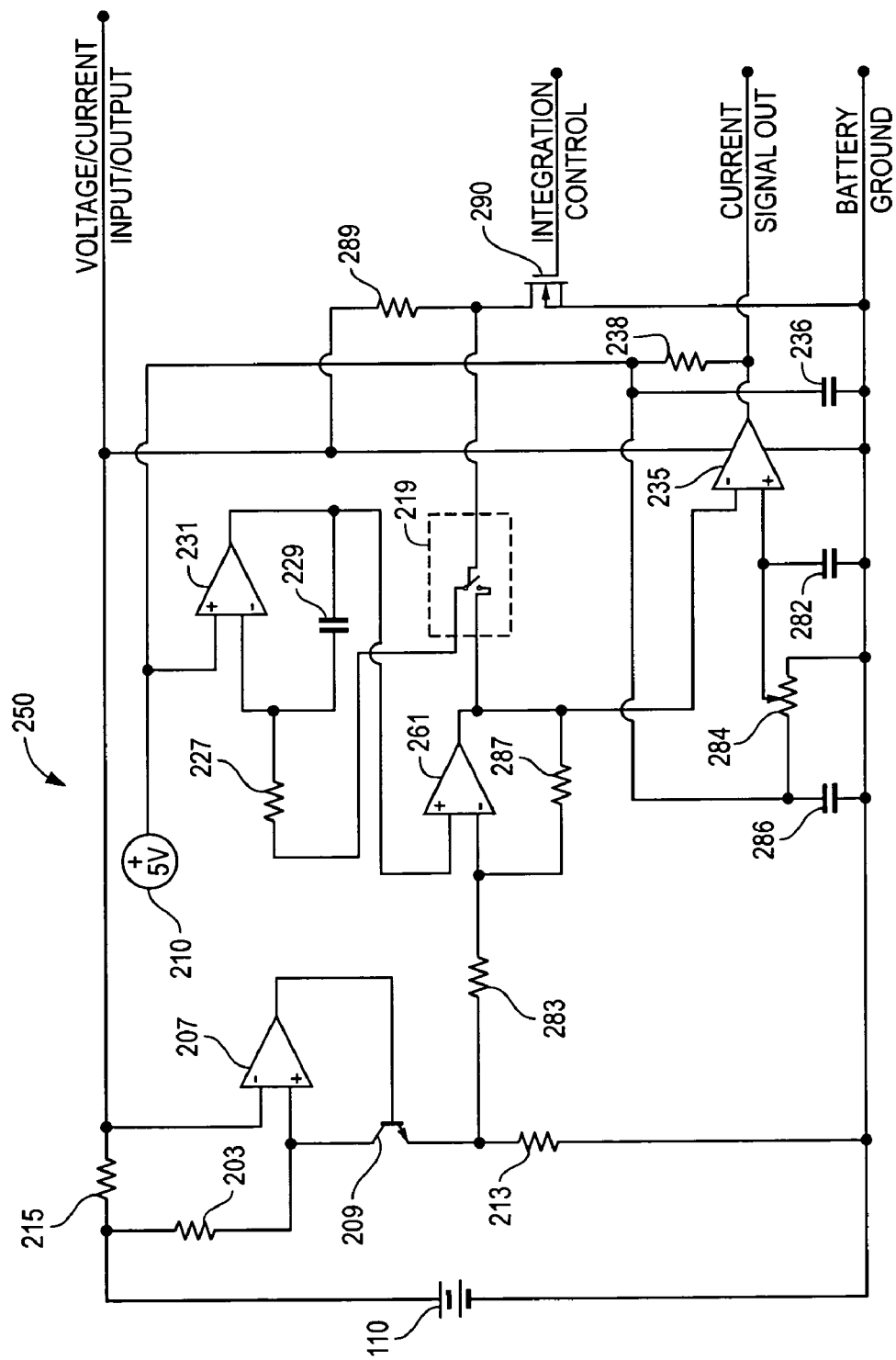
FIG. 2C shows a circuit diagram of a power source, a current sensor, and a current receiver circuit including an analog gate, in accordance with an embodiment of the present invention in which a low impedance resistor is used as a current sensor.

An alternative embodiment of the current sensor and current receiver circuit 105 is shown as the circuit 250 in FIG. 2C. The circuit 250 is generally similar to the circuit 200; however, there are several important differences. First, the pair of transistors 206 and 208 of circuit 200 (and their biasing resistors 202, 204, 214, and 216) are replaced in circuit 250 with a block of resistor 203, op-amp 207, and transistor 209, which are commercially available as a current sensor block—for example, from TEXAS INSTRUMENTS. Second, the diode biasing network 218 of circuit 200 is replaced in circuit 250 with an analog gate 219. The analog gate 219 generally allows for the op-amps 220 and 223 of circuit 200 to be eliminated. In an embodiment, a 4066 quad-gate chip provides the analog gate 219; however, as will be appreciated by those of ordinary skill in the art, other analog gate packages might also be used. Third, the circuit 250 provides a set of capacitors 282 and 286, and a potentiometer 284 for calibration of the signal comparator 235. The output of the comparator 235 will be high when the output of the integrator 231 remains stable at +5V.

Advantageously, the analog gate 219 also allows for the integration of signals to be switched on or off using an integration control transistor 290. In operation, when a node is sinking current, the transistor 290 will pull the analog gate 219 open, so that the current level of voltage on the output of op-amp 261 is held. Conversely, when voltage polarity is being switched, the inputs to the analog gate 219 are shorted (or connected across an impedance of between about 400 Ohm and 500 Ohm), connecting the output of op-amp 261 to the negative input of the integrator 231.

Figure 2D:
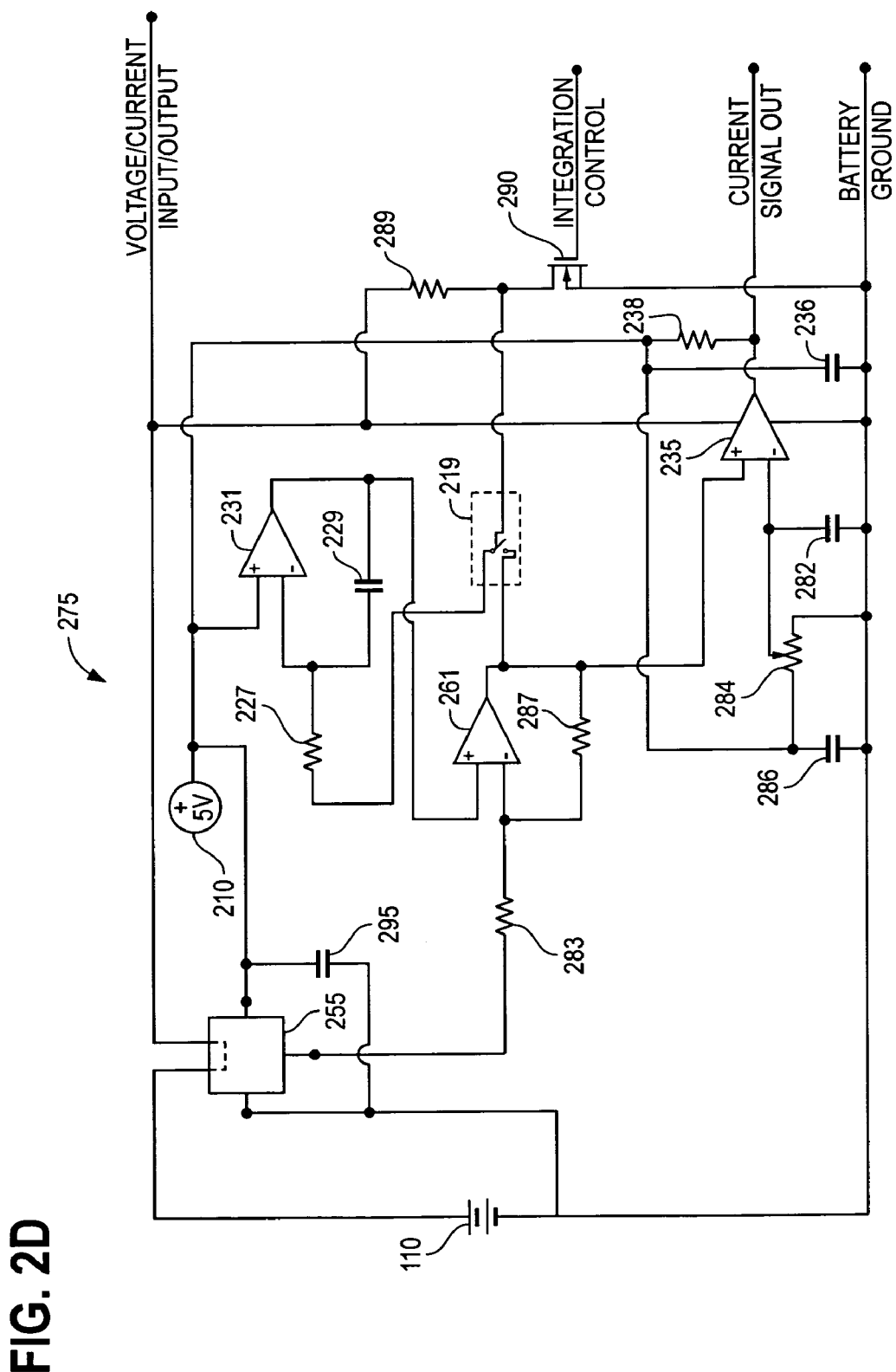
FIG. 2D shows a circuit diagram of a power source, a current sensor, and a current receiver circuit including an analog gate, in accordance with an embodiment of the present invention in which a hall sensor is used as a current sensor.

The current sensor and current receiver circuits 200 and 250 are generally suitable for use with currents of less than about 30 Amps. If larger currents are desirable, the current sensor and current receiver circuits 225 and 275 of FIGS. 2B and 2D provide advantages. In the embodiments of FIGS. 2B and 2D, the low impedance resistors 215 of FIGS. 2A and 2C are supplanted by a hall sensor 255. However, the circuits 225 and 275 still include a power source 110, five-volt regulator 210, and a network of op-amps acting as integrators, drivers, and comparators.

Hall inductive DC current sensors are standard, off-the-shelf components available from a number of electronic equipment manufacturers. Most hall sensors include a slotted ferrite ring core. In the slot is a hall chip. A compensation coil is wrapped around the ring in a toroidal (donut-like) shape, and the hole through the center of the toroidal coil allows a conductor to be passed through the center of the ring. When a current passes through the main conductor, a magnetic field is developed around the conductor. The magnetic field is concentrated by the ferrite core and sensed by the hall chip. The direction of the current determines the output voltage polarity of the hall device. If a small current opposing the main conductor current is allowed to flow through the compensation coil, the two currents may oppose one another, causing the hall chip to produce a zero voltage output. The hall sensor works with both DC and AC current.

Turning to FIG. 2B, there is shown in circuit 225 how the hall sensor 255 is connected in serial with the V/C I/O line, and also to battery ground. The positive and negative outputs of the hall sensor ("+" and "−" in FIG. 2B) are connected to the current receiver circuit of FIG. 2B. The negative output goes to the positive input of noninverting op-amp 257, the output of which is fed back to its negative input through the diode array 256 and capacitor 276. The output of op-amp 257 also runs through a high impedance resistor 258 (about 10 kOhm) to the negative input of integrating op-amp 265. (The capacitor 262 and resistor 258 form the integrating network for the op-amp integrator 265.) The output of the op-amp integrator 265 is fed to the base of emitter follower transistor 254 and current limiting resistor 252, and then on through the compensation coil of the hall sensor 255 to battery ground. Thus, a complete loop is closed for detecting variations of current on the V/C I/O line.

Referring to FIG. 2D, the circuit 275 provides advantages to circuit 225 similar to those that circuit 250 provides to circuit 200—the diode network 256 of circuit 225 in FIG. 2B has been replaced by an analog gate 219 in the circuit 275 of FIG. 2D. Also, an integration control transistor 290 allows for control of the integration of signals from nodes, and a set of capacitors 282 and 286 and potentiometer 284 allow for tuning of the comparator 235.

Note that the op-amp 270 of circuit 225 (FIG. 2B) corresponds to the op-amp 220 of circuit 200 (FIG. 2A), acting as a voltage follower for the five-volt regulator 210 and providing a stable reference voltage for the rest of the circuit 250. The reference voltage is used in circuit 225 for the positive input to the op-amp integrator 265, the positive input for the comparator 235 (whose output provides the Rx signal for the controller microprocessor 125), and the op-amp driver 260 for the diode network 256. Advantageously, the circuits 250 and 275 of FIGS. 2C and 2D allow for such voltage followers to be eliminated.

Referring again to FIG. 2B, the operation of the circuit 225 shall be described in more detail. In operation, the hall sensor 255 indicates changes in the current on the V/C I/O line by changing the voltage difference between its positive and negative outputs. Voltage changes are sensed by op-amp 257 and passed through diode array 256 and the op-amp integrator 265. Output of the integrator 265 runs to the emitter follower 254, which varies the current through current limiting resistor 252 and the compensation coil of the hall sensor 255 such that the current coming from the V/C I/O line is counterbalanced. Although the current flowing through the V/C I/O line is large, and the current flowing through the compensation coil of the hall sensor 255 is small, the many turns in the compensation coil increase the effective amperage to counterbalance the current on the compensation coil and the V/C I/O line.

Small changes in current on the V/C I/O line are eventually reflected in voltage changes on the Rx signal out line. When a small change in current is detected by the hall sensor 255, the output of the op-amp 257 will show the change to op-amp comparator 235, the output of which runs to the controller processor. Large changes in current on the V/C I/O line may also be detected, in which case the output of the op-amp 257 will be very large. The back-to-back Zener diodes 266 (with about 2.4V breakdown voltage) allow for greater than 3V voltage excursions by the output of op-amp 257. The Zener diodes 266 are connected (around the diode array 256 and the integrating resistor 258) by a shunt resistor 264. The shunting effectively speeds up integration by the op-amp 265, integration resistor 258, and integration capacitor 262. The feedback loop for the compensation coil is, in turn, dramatically quicker. The shunting Zener diodes 266 and resistor 264 allow active sinking of very high currents at the nodes.

Figure 3A:
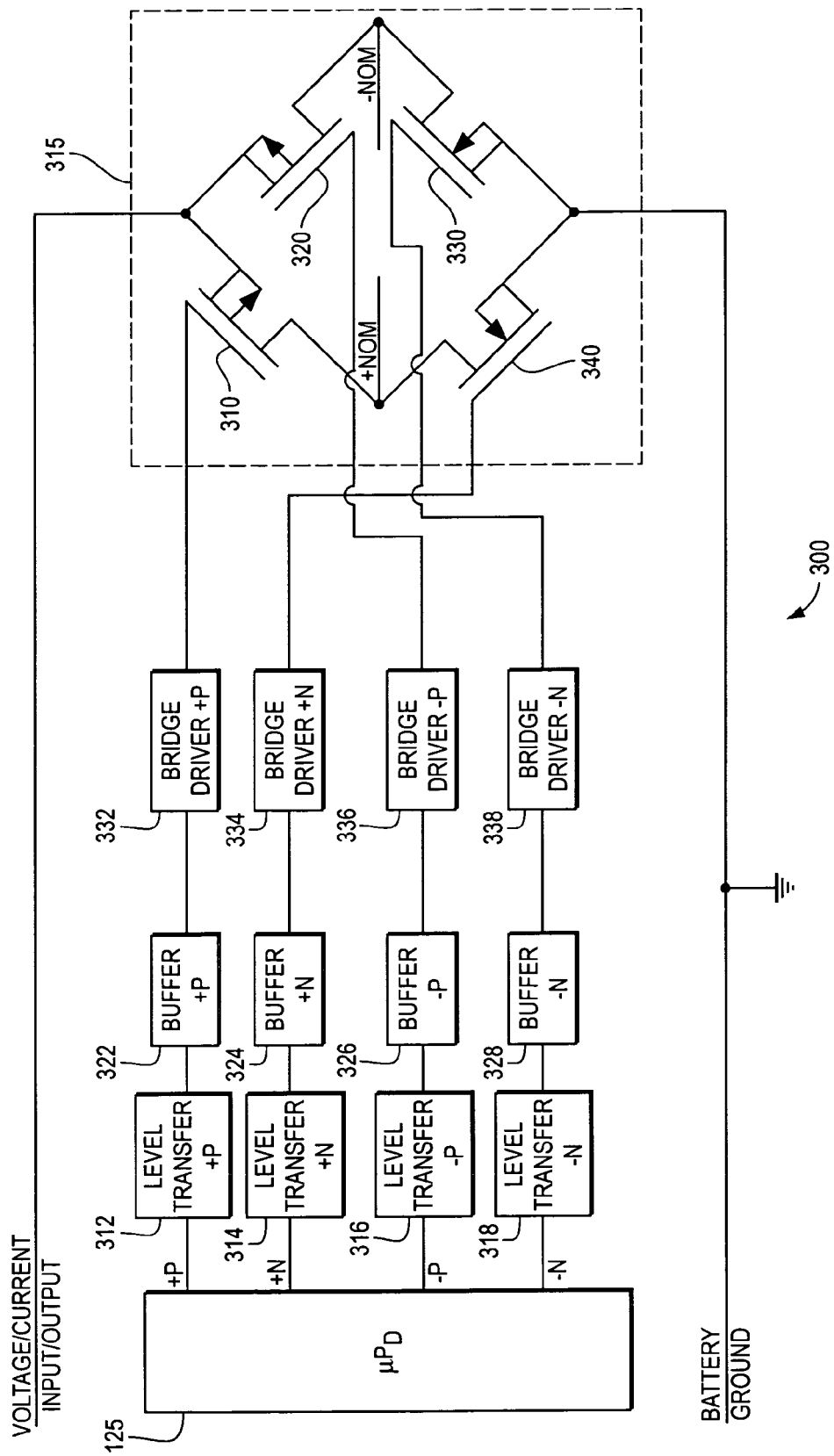
FIG. 3A shows a logical block diagram of a driver, in accordance with an embodiment of the present invention.

In various embodiments of the present invention, the current receiver circuit (one of circuits 200, 225, 250 or 275) works in conjunction with a driver 120 to control the voltage on the +NOM and −NOM lines that run to nodes. A logical block diagram 300 of the driver is shown in FIG. 3A, along with a circuit diagram 350 of one embodiment of the driver in FIG. 3B. The driver 120 is optional for use with the present invention to the extent that lower power or lower speed +NOM and −NOM lines could be controlled by simple modifications of the current receiver circuit—for example, by adding a bipolar transistor H-bridge 315 to the V/C I/O and battery ground lines of FIGS. 2A and 2B. But the H-bridge 315 of power Metal Oxide Semiconductor Field-Effect Transistors (MOSFETs) of the driver diagram 300 allows for much faster and higher-powered voltage switching on the +NOM and −NOM lines.

Figure 3B:
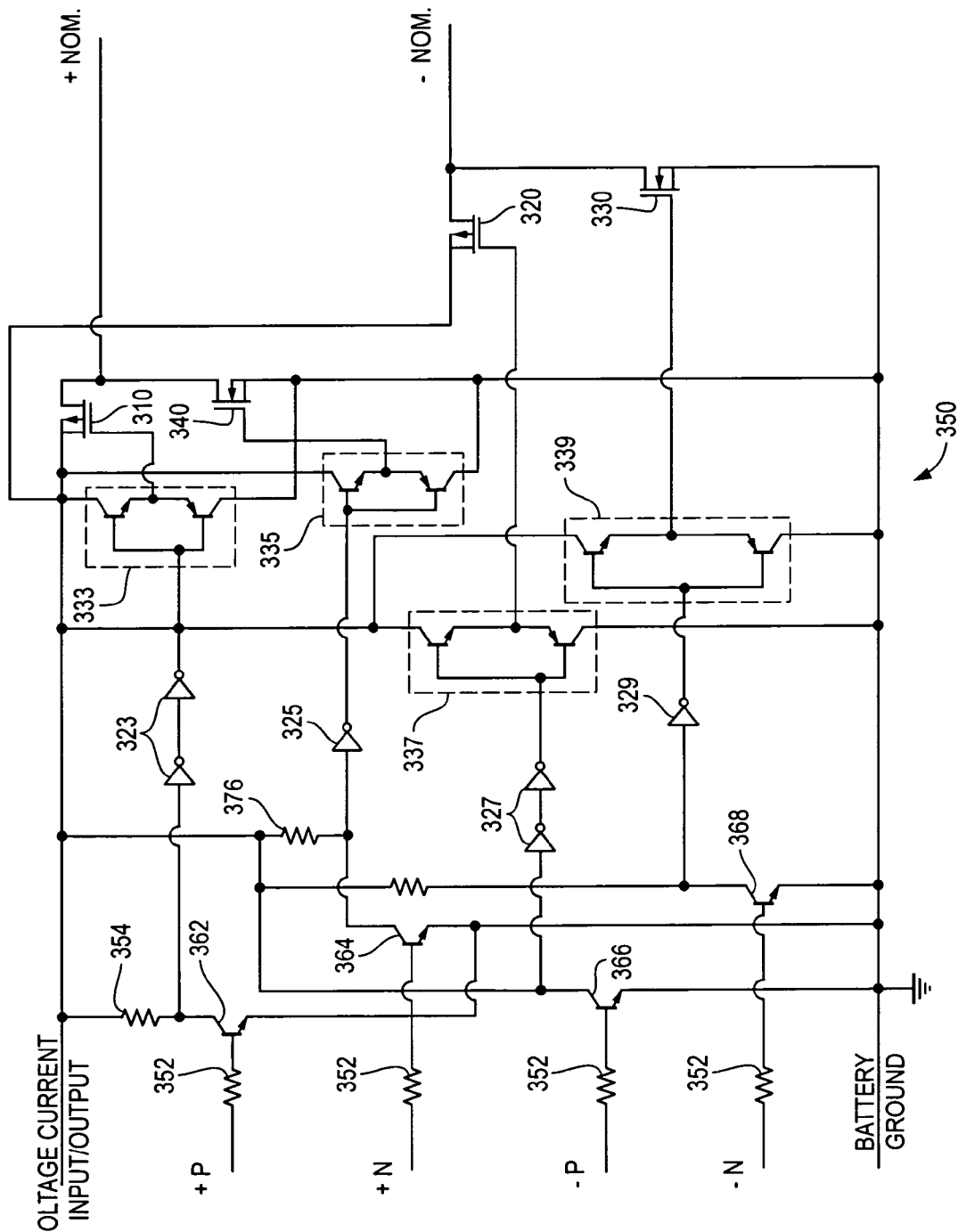
FIG. 3B shows a circuit diagram of a first embodiment of a driver, in accordance with an embodiment of the present invention.
Figure 3C:
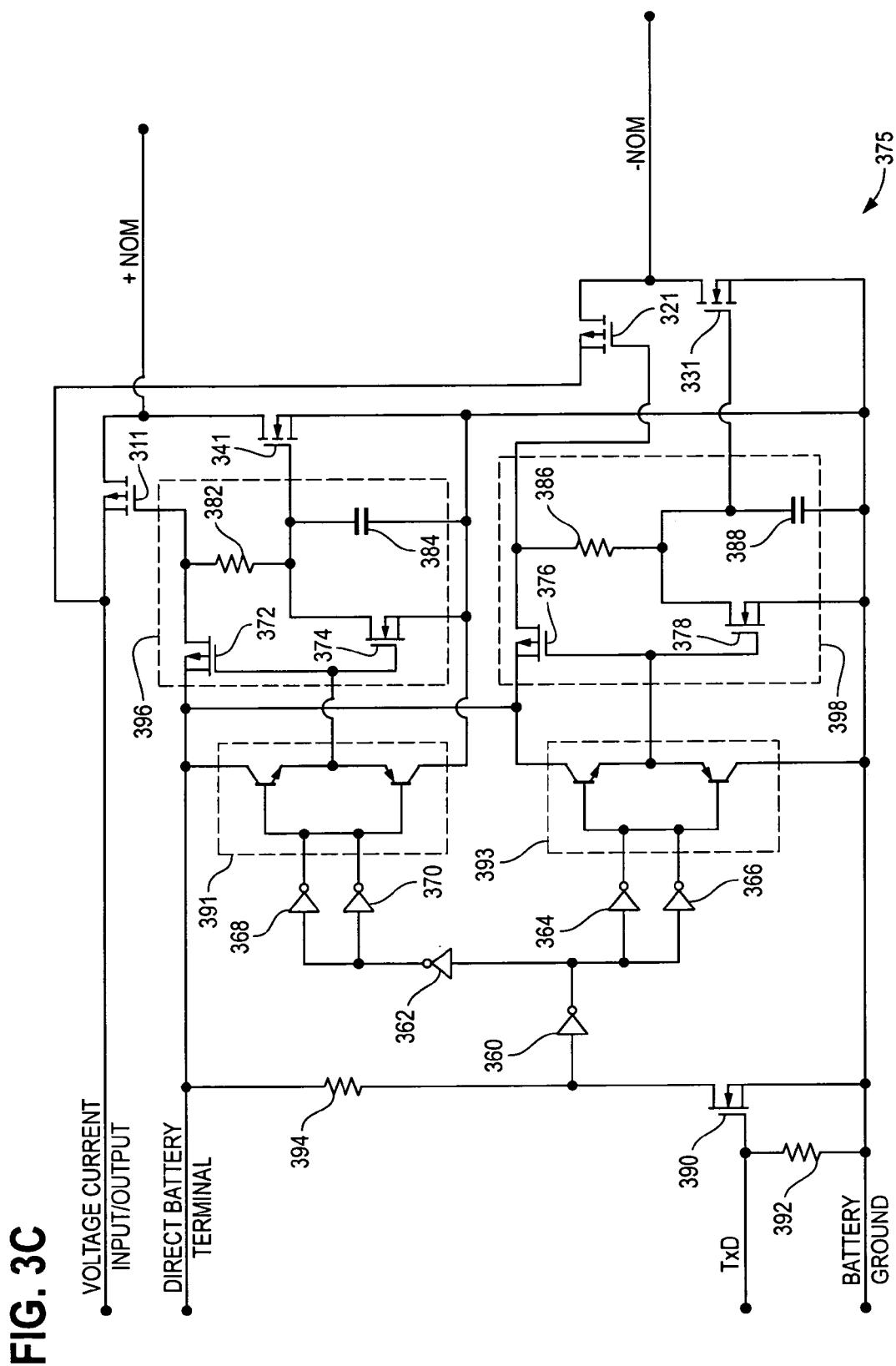
FIG. 3C shows a circuit diagram of a second embodiment of a driver, in accordance with an embodiment of the present invention.

As shown in FIGS. 3A and 3B, the controller microprocessor 125 has in some embodiments four digital outputs connected to the driver 120: plus positive, plus negative, minus positive, and minus negative ("+P", "+N", "−P", and "−N"). In an embodiment, these four lines will vary between a digital low of zero V and a digital high of +5V. In many embodiments, the DC voltage difference between the V/C I/O and battery ground lines will be much larger—for example, between +13.6 V and zero V. Level transfer devices 312, 314, 316, and 318 serve to up-convert the voltage levels to that of the V/C I/O line to ground voltage difference. In the embodiment of FIG. 3C, the controller microprocessor 125 has a single digital output (Tx) that is connected to the driver across a transistor 390.

One embodiment of the level transfer devices 312, 314, 316, and 318 in FIG. 3A is shown in FIG. 3B, wherein the NPN bipolar transistors 362, 364, 366, and 368 serve as level transfer devices in circuit 350. In such an embodiment resistors 352 are placed in series with the base, and for the +lines (transistors 362 and 364) resistors (354 and 376) are placed between collector and V/C I/O line. For example, for a voltage level transfer from +5V to +13.6V, 4.7 kOhm resistors are selected for base resistors 352 and 1 kOhm resistors for collector resistors 354 and 376.

In a second embodiment of the driver circuit, circuit 375 shown in FIG. 3C, the +P, +N, −P, and −N lines from the controller microprocessor 125 are replaced with a single output line "TxD" from the controller microprocessor 125. The TxD line runs to the gate of depletion-type MOSFET transistor 390 and across a high impedance resistor 392 (about 100 kOhm) to battery ground. The drain of the transistor 390 is tied to a line that runs to the battery terminal through resistor 394, and the source of the transistor 390 is tied to battery ground. A common buffer 360 is connected in parallel with the resistor 394 to the drain of transistor 390.

The circuit 375 of FIG. 3C also solves an important problem: the H-bridge transistors for either the +NOM or the −NOM line (that is, for the +NOM line, 310 and 340 in FIG. 3B, or 311 and 341 in FIG. 3C) must not be on at the same time. If both +NOM or −NOM H-bridge transistors are on, then the power source 110 will be shorted across the H-bridge transistors. In the embodiment of FIG. 3B, this problem is solved using software on the controller microprocessor 125, which controls the +P, +N, −P, and −N lines. Using the software, the lines are all turned off momentarily before the H-bridge switches from the +NOM to −NOM state or back. This effectively avoids a short of the power source 110 across the H-bridge. The circuit 375 of FIG. 3C, however, solves the same problem without recourse to software, and without four separate lines controlling the H-bridge.

Referring to FIG. 3C, the circuit block 396 prevents the sets of transistors 311 and 341 from being turned on at the same time and thereby shorting the power source 110. (Circuit block 398 operates in substantially the same manner as circuit block 396; thus, only circuit block 396 is described herein.) In circuit block 396, resistor 382 prevents large rushes of current from flowing between transistors 311 and 341, and allows for transistor 311 to be turned off very quickly—for example, if the $r_{DS}$ impedance for transistors 372 and 374 is 0.1 Ohm and transistor 311 has an input capacitance of 9 nF, then the RC time constant is about 900 picoseconds. With circuit block 396 in place, the transistor 341 will require a time several orders of magnitude longer to turn on than transistor 311 requires to turn off—if the effective input impedance of transistor 341 includes 9 nF (5 nF from transistor 341 and 4 nF from capacitor 384) and 100 Ohm from resistor 384, then the RC time constant is about 900 nanoseconds, or three orders of magnitude longer. Hence, the combination of a relatively large impedance resistor 382 and balancing capacitor 384 prevents the power source 110 from being shorted across the transistors without recourse to software and additional output lines on a microprocessor.

Turning back again to the logical block diagram 300 of FIG. 3A, in addition to voltage level transfer, buffering may be necessary for driving the H-bridge 315. In the block diagram 300, there is shown the use of buffers 322, 324, 326, and 328 and bridge drivers 332, 334, 336, and 338. In the embodiment shown in circuit 350 of FIG. 3B, the buffers and bridge drivers are implemented as CMOS inverting buffers 323, 325, 327, and 329 (two each for the positive lines and one each for the negative lines) and bridge drivers 333, 335, 337, and 339.

The second embodiment of the driver circuit, circuit 375 of FIG. 3C, provides some additional advantages over the circuit 350 shown in FIG. 3B in working with higher currents. In circuit 375, CMOS inverting buffers 364, 366, 368, 370 are also used to supply input to the bridge drivers 391 and 393. (An extra CMOS inverting buffer 362 is placed in series with the inputs to positive line inverting buffers 368 and 370.) But in addition to the bridge drivers 391 and 393, circuit 375 adds transistor buffers 372, 374, 376, and 378 in order to decrease switching rates of the H-bridge transistors 311, 321, 331, and 341 in circuit 375. The resistors 382 and 386 and capacitors 384 and 388, together with the transistor buffers 372, 374, 376, and 378, provide a complementary MOSFET emitter follower buffer for the H-bridge transistors.

The H-bridge 315 is an important component of the driver 300. The H-bridge is shown also in circuits 350 and 375 (in FIGS. 3B and 3C), but is not drawn in a traditional bridge layout shown in FIG. 3A. An H-bridge generally includes four MOSFETs (two n-channel and two p-channel, all enhancement type) that allow a load current to be reversed as desired. As mentioned above, bipolar transistors could also be used to build a similar bridge, but MOSFETs are superior for a variety of reasons, such as lower resistance when active.

Table 1 is a state table for an embodiment of the H-bridge. As shown in Table 1, only two states (COM Mark and COM Space) are generally used while the system is in operation. Unused but nondestructive states are also shown in Table 1 for additional clarification of H-bridge operation. Destructive states include those states in which transistors 310 and 340 or transistors 320 and 330 are turned on at the same time, resulting in a short circuit of the power source 110. The DC voltage polarity of the +NOM and −NOM lines is swapped as the H-bridge switches between the COM Mark and COM Space states. This voltage polarity reversal allows for information to be sent from the controller microprocessor 125 to the nodes and eventually to the node microprocessors.

TABLE 1

| H-Bridge States | | | | | |
|---|---|---|---|---|---|
| High/Low On/X[o]ff | COM Mark | COM Space | Off | Unused States | |
| +P | H | L | L | H | L |
| +N | L | H | L | L | H |
| −P | L | H | L | H | L |
| −N | H | L | L | L | H |
| Transistor 310 | O | X | X | O | X |
| Transistor 320 | X | O | X | X | O |
| Transistor 330 | X | O | X | O | X |
| Transistor 340 | O | X | X | X | O |
| +NOM | H/O | L/O | X | H/O | L/O |
| −NOM | L/O | H/O | X | H/O | L/O |

Figure 4A:
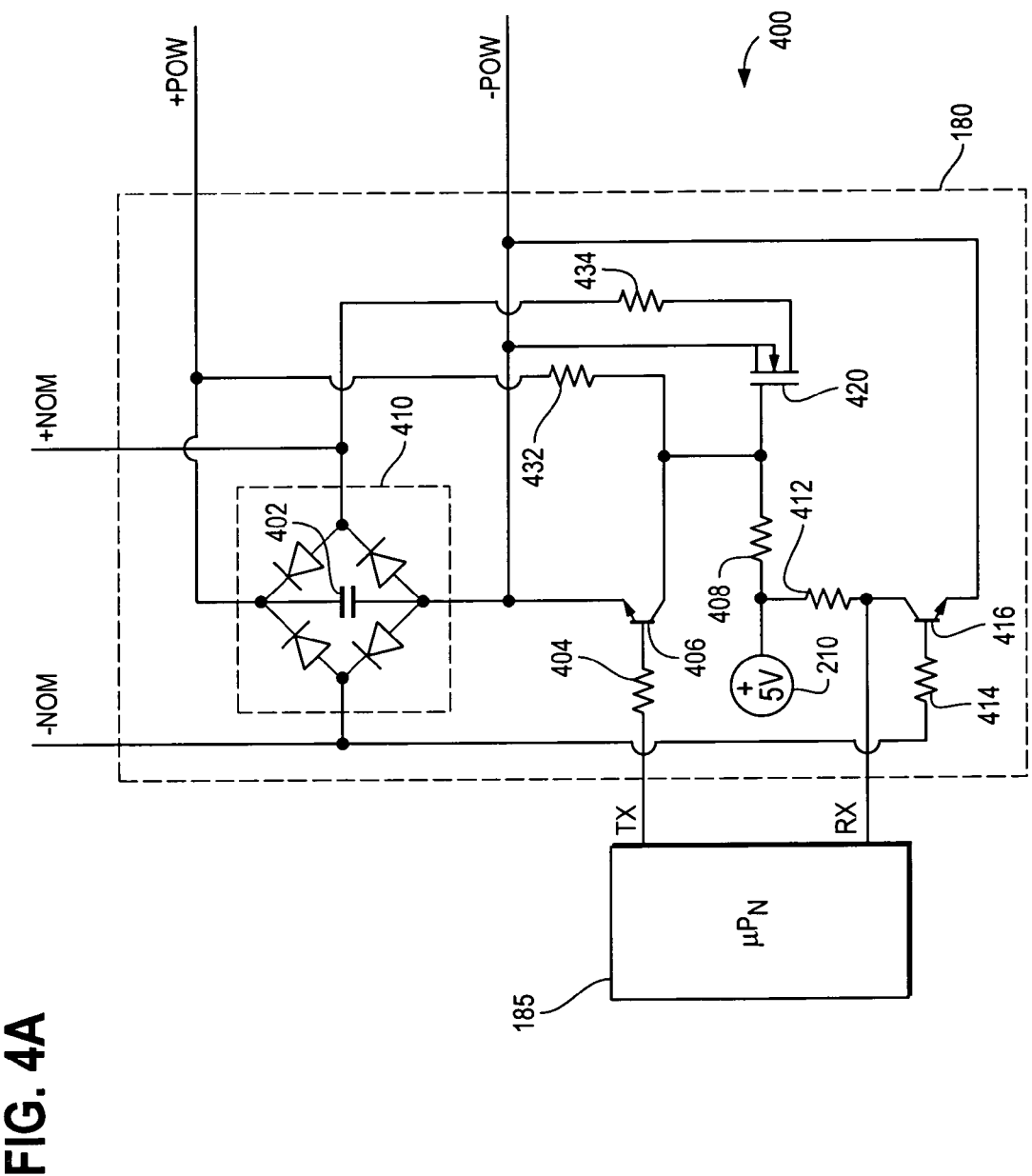
FIG. 4A shows a circuit diagram of a first embodiment of a node, in accordance with an embodiment of the present invention.
Figure 4B:
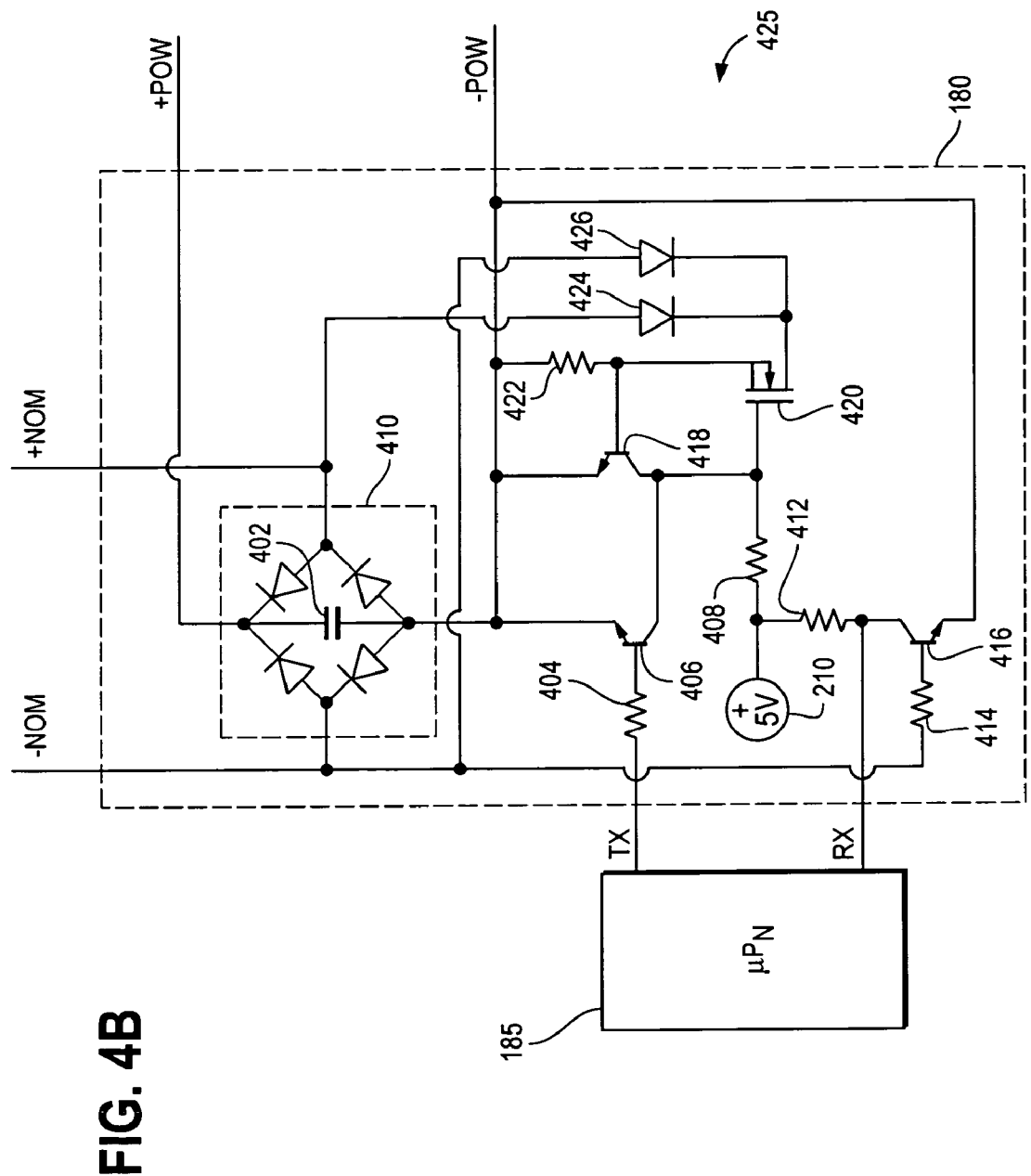
FIG. 4B shows a circuit diagram of a second embodiment of a node, in accordance with an embodiment of the present invention.
Figure 8:
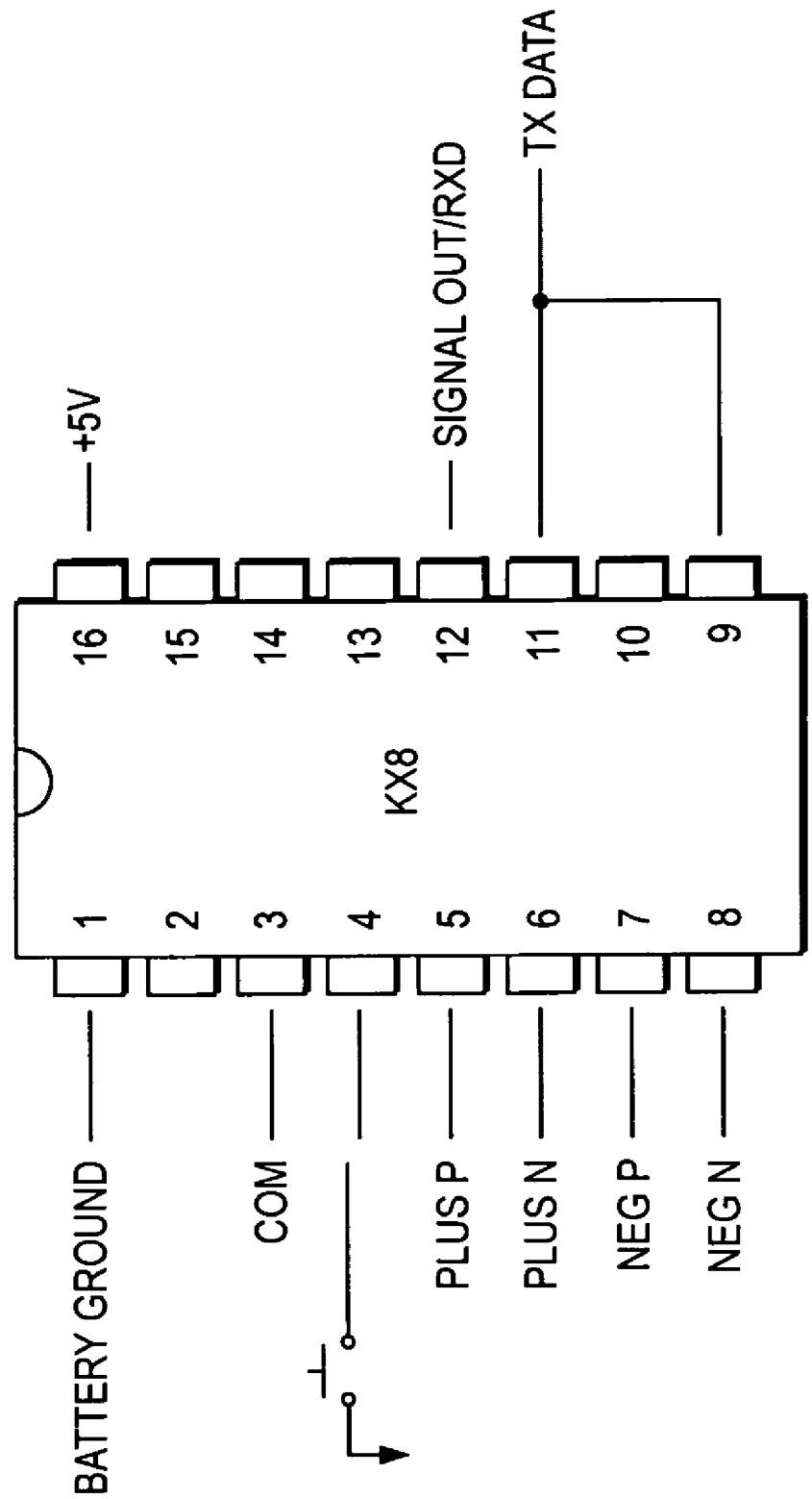
FIG. 8 shows an embodiment of a controller microprocessor, in accordance with an embodiment of the present invention.

In FIGS. 4A and 4B, two embodiments of node circuits (circuits 400 and 425) with active current sink, node microprocessor 185, and load output lines (+POW and −POW) are shown. Each node includes a full-wave bridge rectifier 410 with a capacitor 402 that is selected to match the load. Each node circuit also includes a level transfer network of resistor 404 and transistor 406. The level transfer network drives an active current sink that comprises the network of transistor 406, CMOS transistor 420, and optionally (as shown in circuit 425 of FIG. 4B) bipolar transistor 418 with current control resistor 422. The diodes 424 and 426 in FIG. 4B serve to protect the active current sink when voltage polarity is switched by the driver 120. When data sent as a voltage polarity reversal is received on the +NOM and −NOM lines, the detector network comprising transistor 416, base resistor 414, and load resistor 412 convert the voltage polarity reversal into a signal that can be read at Rx by node microprocessor 185. An embodiment of the pin-out assignment for a controller or node microprocessor is shown in FIG. 8. In the embodiment of FIG. 8, a MOTOROLA 68HC908 series KX8 microprocessor is shown.

The present invention also comprises a method for transmitting both power and bidirectional data over a set of wires. Power is provided as a uniform DC voltage on the set of wires. In an embodiment of the method, data is transmitted from a controller through the set of wires to a node by switching the polarity of the DC voltage on the set of wires and data is transmitted from the node to the controller through the set of wires by active sinking current at the node.

In accordance with an embodiment of the method of the present invention, when a power source is connected and the controller microprocessor 125 is initiated, the controller microprocessor 125 waits for the steady-state condition (in an embodiment, the COM Mark state) to be established before data is transmitted. Data issues from the controller microprocessor 125 through the +P, +N, −P and −N outputs (see FIGS. 1, 3A, and 3B) and is sent to corresponding inputs on the driver 120. In the COM Mark state, battery 110 power is placed on the +NOM line. Referring to the embodiment of the driver 120 shown in FIG. 3B, when transistor 320 is off, transistor 330 is off and transistor 340 is on, and the battery ground is placed on the −NOM line.

In such an embodiment, the nominal lines feed the nodes (for example, nodes 140, 160, and 180) through the +NOM line and −NOM line into the diode bridge 410 and capacitor 402, charging capacitor 402 and initializing the node microprocessors (for example, 145, 165, and 185) at each node. When the Tx data line from the node microprocessors has a digital high (that is, a digital "1"), the active current sink (including, in an embodiment, resistor 408, diode 424, transistors 418 and 420, and resistor 422) is off—current is not sunk. In such a state, the −NOM line is low, and transistor 416 is off, giving Rx data a digital high.

Having achieved the steady-state, the method may proceed by transmission of data from the controller to the nodes. When the controller microprocessor 125 begins to send out a byte of data, the start space of the first byte places a digital low (that is, a "0" or zero) on all controller lines (+P, +N, −P, and −N), turning off voltage translators 362, 364, 366 and 368. The inputs to the buffers 323, 325, 327, and 329 are all digital highs, making the outputs of the noninverting buffers (323 and 327) digital high so that their corresponding bridge drivers (333 and 337) are digital high, and the transistors 310 and 320 are off. At about the same time, the outputs of inverting buffers 325 and 329 are low, making the outputs of their corresponding bridge drivers (335 and 339) low so that the output transistors 330 and 340 are also off. Thus, at the beginning of data transmission from the controller to the nodes, the +NOM line and the −NOM line float at a high impedance. In an embodiment, this state exists for less than about one microsecond.

After the initial blank (or "OFF" state), the controller microprocessor 125 outputs switch to +P low, +N high, −P high, and −N low (or the "COM Space" state). In the COM Space state, translator 364 turns on. When the output of 364 goes low, the outputs of buffer 325 and its bridge driver 335 go high, turning on output transistor 340, so that the +NOM line goes low. The −P output from the controller microprocessor 125 goes high at the same time, making the output of translator 366 go low (along with the corresponding buffer 327 and bridge driver 337), turning on output transistor 320 so that the −NOM line goes high. This change on the nominal lines to the COM Space state is felt at all the nodes connected by the set of wires (for example, 140, 160, and 180).

In an embodiment of the method, the bridge rectifier 410 at each node receives the positive voltage on the −NOM line, and the negative voltage on the +NOM line. Each bridge rectifier 410 places positive power on output +POW and −POW. The system is stable in the COM Space state. The next bit from the controller microprocessor 125 will be sent in the COM Mark state, such that all the controller microprocessor 125 output lines go low again, turning off the translators 362, 364, 366 and 368, and subsequently turning off the output driver transistors 310, 320, 330 and 340. As before, in the COM Mark state, the system floats the +NOM line and −NOM line. In an embodiment, going from the COM Space state to the COM Mark state takes less than a microsecond.

In the COM Mark state, the −NOM line is detected as low at transistor 416, turning it off. The load resistor 412 pulls the Rx data line high, designating a mark (digital high) on the Rx data input to the node microprocessor 185 (in FIGS. 4A and 4B). Conversely, in the COM Space state, the −NOM line is detected as high at transistor 416, allowing current to flow and pulling the Rx data input to the node microprocessor 185 low, thereby designating a space. Sequential reversals of polarity on the +NOM and −NOM lines are thus effective for creating a digital signal on the Rx data input to the node microprocessor 185. In addition, the bridge rectifier 410 switches the power of the input lines to the proper polarities for +POW and −POW on each node. In an embodiment of the present invention, each time the controller microprocessor 125 changes the system state from COM Mark to COM Space, the above method is carried out through cooperation between the various components of the system.

After data has been received at a node, a node microprocessor 185 may begin to transmit data. The digital data from the node microprocessor 185 appears at the Tx data output line, normally as a digital high. When the Tx line goes high, transistor 406 switches on and the active current sink (including, in an embodiment, resistor 408, diode 424, transistors 418 and 420, and resistor 422) turns off. When the Tx line goes low, transistor 406 switches off and allows the active current sink to operate. When the active current sink is operating, current flows through resistor 408, pulling the gate of transistor 418 high and turning on transistor 420. When transistor 420 is on, current flows in source resistor 422; as current increases, the voltage across resistor 422 rises to a point at which transistor 418 will turn on, pulling the gate of transistor 420 down until a steady and constant current is flowing through resistor 422 and diode 424. Data is effectively sent through the set of wires, since the sinking of current is felt on the +NOM line and thereby returned to the current receiver circuit (for example, circuits 200 or 250).

On passing through the driver 120, the current is translated through transistor 330 from the −NOM line to Battery Ground, and the current is also translated through output driver 310 from the +NOM line to the V/C I/O line. The V/C I/O line also runs to a sensor (for example, the hall sensor 255 or current sensing resistor 215). Embodiments of a method for sensing the current signal through a current receiver circuit 105 (for example, circuits 200 or 250) are described in the foregoing.

In an embodiment, the method and system described in the foregoing are used in accordance with a communications protocol designed for use with the present invention ("the protocol"). In other embodiments of the present invention, a different communications protocol—for example, the LIN protocol or CAN protocol—might be used. However, the protocol described herein provides advantages over other communications protocols that might be used with the system and method of the present invention because it is designed for communications over a set of two wires.

In an embodiment of the protocol, data flow is structured into 9-bit words. Each word includes eight bits for address and command information and a ninth parity bit for use with error correction routines (for example, the parity bit may be set high so that the number of bits high in any word is odd; whenever a non-odd total is received by a microprocessor, an error correction routine may be initiated).

The address information, which may be carried by 9-bit words in the protocol, is associated with a data structure defined by how nodes are used in a particular embodiment of the system. The protocol does not distinguish, in an embodiment, between nodes with sensor loads and nodes with actuator loads. For example, in an embodiment of the system in which 32 sensor or actuator nodes are connected to a set of wires, each node having 4 sub-nodes, the address space for the protocol reserves hexadecimal addresses $00 to $7F (corresponding to 32×4=128 distinct addresses) for use in addressing the nodes and sub-nodes. In another embodiment, rather than sub-nodes, the four addresses reserved for each of the nodes might be assigned to a sub-function of the node.

As will be appreciated by those of ordinary skill in the art, the system of the present invention may be adapted for use with any of a variety of communications rates. In an embodiment, a 31.25 kbaud has been adopted, which allows for data transfer rates of about 350 microseconds/9-bit word.

Command information, which may be carried in a 9-bit word in the protocol, is set up so that specific commands are associated with specific 8-bit (binary) numbers that begin with $80 (hexadecimal) immediately after the end of the reserved addresses. Table 2 shows an embodiment of how commands are assigned within the protocol.

TABLE 2

An Embodiment of Protocol Commands

| COMMAND CODE (Hexadecimal) | DESCRIPTION OF COMMAND |
| --- | --- |
| BLANK | Notification of start of address or command sequence |
| $80 | Collect Data |
| $81 | Shift Data |
| $82 | Poll Sensors |
| $83 | Alert All Addresses |
| $84 | Actuator Report |
| $85 | Actuator Error Report |
| $86 | Actuator Status |
| $87 | Sensor Report |
| $88 | Sensor Error Report |
| $89 | Sensor Status |
| $8A | Node Error Indicator |

As shown in the embodiment of Table 2, a "BLANK" signal indicates that a word with an address or command is to follow. When the BLANK signal is followed by $80, the address of a sensor node immediately follows. "Collect Data" is a standard command used to collect new information from nodes for the controller (described further below). The "Shift Data" ($81) command, which follows address and command sequences, is used to place all data reported from a sub-function (usually associated with a sensor) at a sensor node onto the actuator output. The Shift Data command thus allows feedback loops to be established between sensor input and actuator output using the system of the present invention. Also shown in the embodiment of the command structure show in Table 2 is the "Poll Sensors" command, which is executed, in an embodiment, every one or two seconds in order to verify the integrity of the system configuration. "Alert All Addresses" is used to notify all addresses (in an embodiment, $00 to $7F) that a command sequence will follow next. "Actuator Report" and "Sensor Report" commands request data from all actuators or sensors in the address space, whereas "Actuator Error Report," "Actuator Status," "Sensor Error Report," and "Sensor Status" commands are directed only to active actuators or sensors. Finally, in an embodiment, the "Node Error Indicator" command is used to notify the controller microprocessor when a node has experienced an error of some kind. In one embodiment, 16 bytes of RAM are set aside in the microprocessor memories for tracking errors of this kind.

Figure 9:
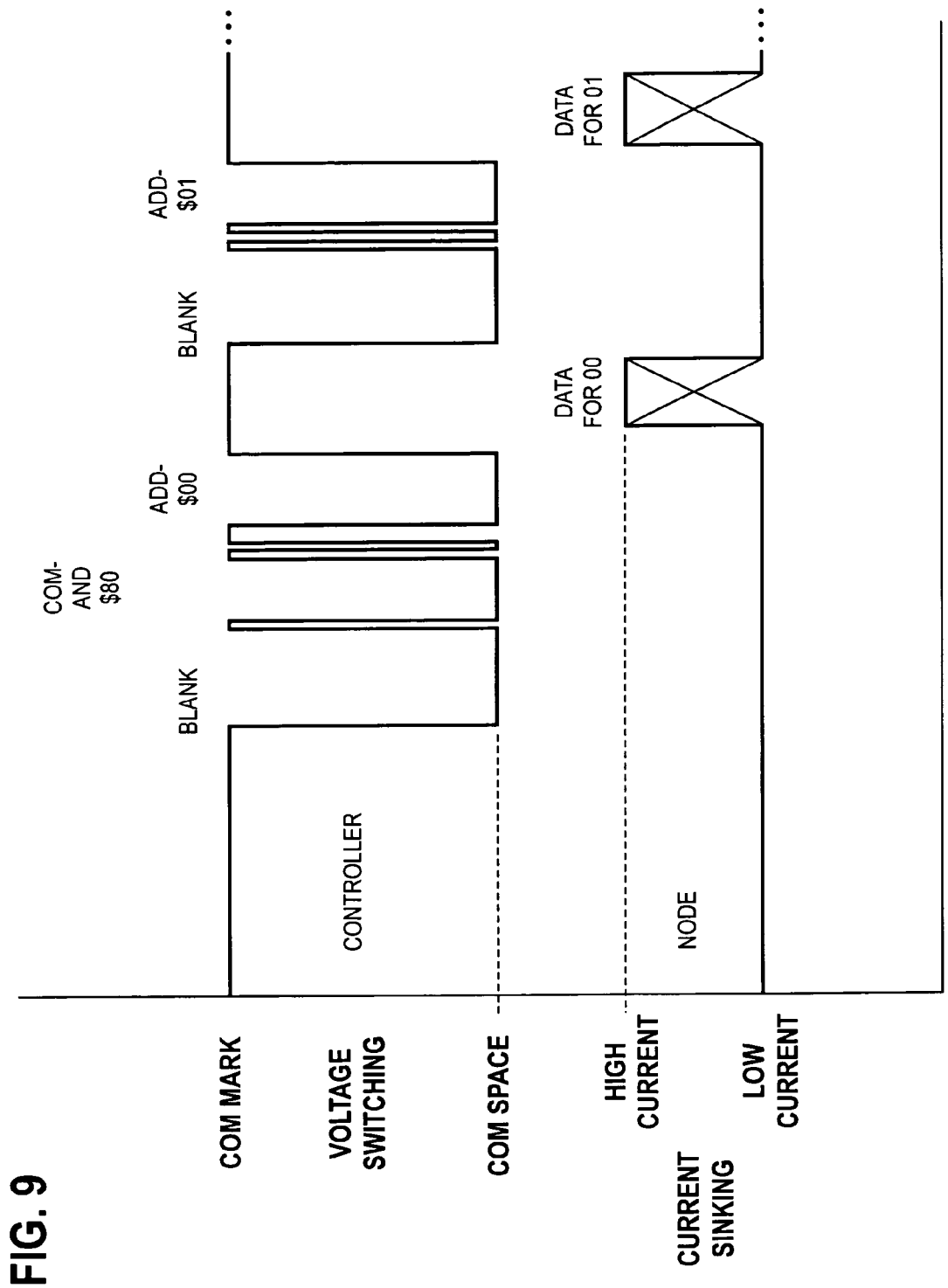
FIG. 9 shows a timing diagram for communications between a controller and a node microprocessor in response to a Poll Sensor command, in accordance with an embodiment of the present invention.
Figure 10:
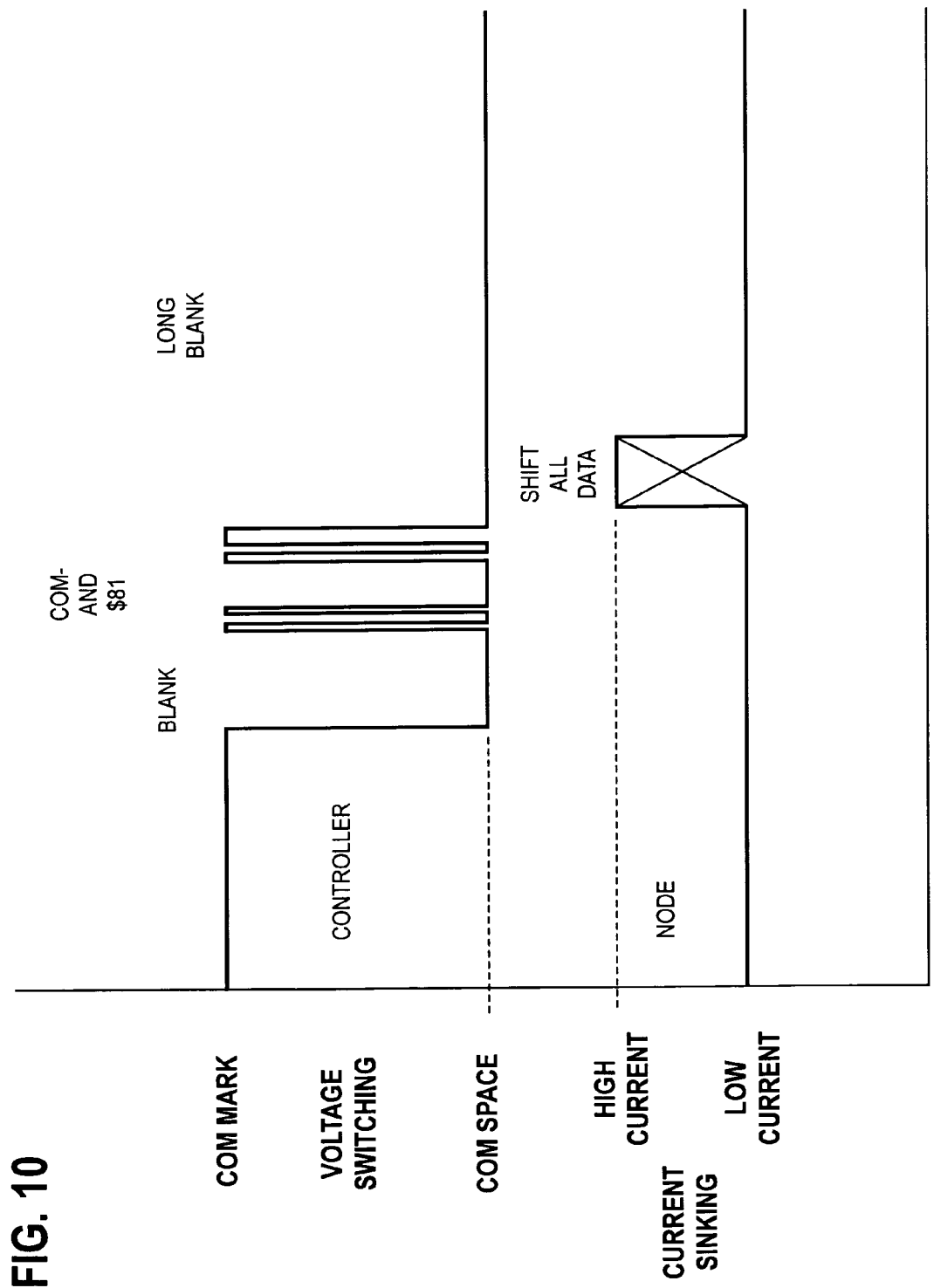
FIG. 10 shows a timing diagram for communications between a controller and a node microprocessor in response to a Shift Data command, in accordance with an embodiment of the present invention.

Referring to FIGS. 9 and 10, there are shown timing diagrams for a complete, structured communication between a controller microprocessor and a node microprocessor. FIG. 9 shows an embodiment of structured communication in response to a Poll Sensor command, and FIG. 10 shows an embodiment of structured communication in response to a Shift Data command, both in accordance with the protocol described herein.

Turning first to FIG. 9, there is shown how a structured communication between a controller and a node microprocessor begins, in an embodiment, with a BLANK command. The system rests in the COM Mark state (described above). The BLANK command, in such an embodiment, results when the H-bridge reverses polarity into the COM Space state. After the BLANK command, the controller microprocessor issues a Poll Sensors command (in an embodiment, $82) that includes parity bits, as described above. The Poll Sensors command, in the embodiment of FIG. 9, is first sent to the node that has been assigned address $00. After the address information has been sent (by voltage polarity reversal) on the set of wires to node $00, the H-bridge reverts to the COM Mark state. The controller processor then waits to receive data from the node microprocessor (through the current sensor and current receiver circuit).

As shown in FIG. 9, the data from the sensor at node $00 is then sent by actively sinking current at node $00, according to the method and system for active current sinking described above. In an embodiment, data sent by a node in response to the Poll Sensors command comprises its own address plus a parity bit; the node repeats and reflects its own address back to the controller. Having received this data from node $00, the controller switches back to the COM Space state in preparation for polling address $01. After node address $01 has been sent (by voltage polarity reversal), the microprocessor at node address $01 responds with data for node $01. Although the timing diagram of FIG. 9 shows the sequence only for node addresses $00 and $01, the sequence then repeats for all nodes in the address space (in an embodiment, from $00 to $7F). In an embodiment, the data received in response to the Poll Sensors command is stored, in memory at the controller microprocessor, in an active sensor file.

Another sequence of commands, addresses, and responses usually follows the sequence shown in FIG. 9. In an embodiment of the protocol, after a Poll Sensors command, the controller processor issues the Collect Data command. The controller processor switches to the COM Space state (i.e., sends a BLANK), sends the $80 (Collect Data command), and then sends the first active sensor address (for example, $AA).

In response, the node microprocessor at address $AA will send a 9-bit word that reflects the state of the sensor at address $AA. For example, if the sensor at address $AA is a switch, and the switch is closed, the node microprocessor may send (using an active current sink) a $FF in response. In an embodiment, the controller processor retransmits the response ($FF) back to the node microprocessor. The same sequence is then repeated for the next active node address. The sequence repeats until data has been collected from every active node address in the system.

Although in the example described above only one 9-bit word (one byte plus one parity bit) is sent from a node microprocessor to a controller microprocessor, it should be understood that the protocol can be configured to allow for additional words to be sent from each node microprocessor to the controller microprocessor—for example, when a node microprocessor is capable of sending a stream of analog data (converted from analog to digital at the node). The node and controller microprocessors can be programmed, in accordance with the protocol, for sending and receiving a specified number of bytes in each transmission.

Turning now to FIG. 10, there is shown an embodiment of how, after the Collect Data command has been executed, data may be placed on the actuators from the sensors at a node using the Shift Data command. Again, the controller microprocessor indicates that a new command or address will follow by issuing a BLANK. The Shift Data (in an embodiment, $81) command is then issued, after which all active nodes transfer commanded data to actuator outputs. During this data shift, the controller processor maintains the H-bridge in the COM Space state, effectively holding a long BLANK so that the power line settles before additional data is transferred.

After the Shift Data command, the protocol may include a sequence, including issuance of an Actuator Error Report, to each active node, in which (similar to the Collect Data command) each active node reports errors back to the controller microprocessor and then receives instructions on how to handle the errors. As may be appreciated by those of ordinary skill in the art, other command sequences may follow, depending on the configuration of sensors and actuators used with the system of the present invention. With a 31.25 kbaud communications rate, the entire communications sequence (including error recognition, diagnostics, and performance monitoring) can be repeated once every 5 seconds. Finally, in accordance with an embodiment of the protocol of the present invention, the errors at each microprocessor may be cleared by placing a zero on the power-on reset.

Figure 5A:
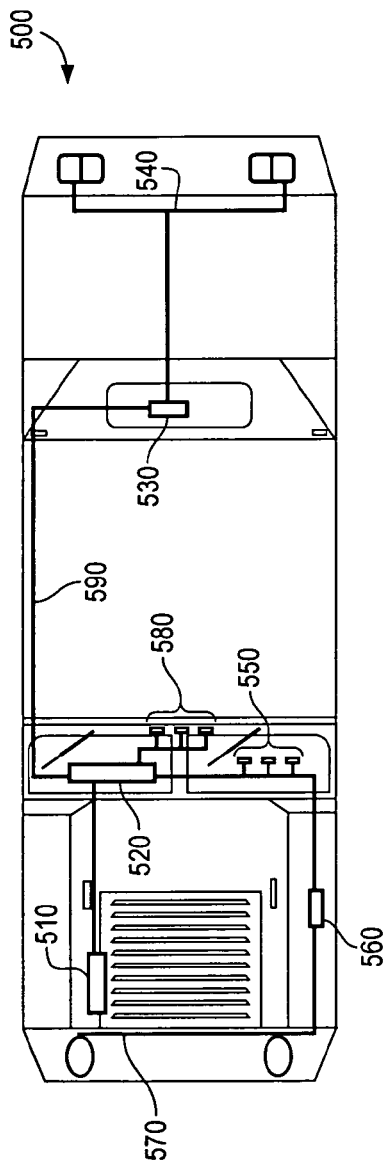
FIG. 5A shows a cross-sectional view of an embodiment of the present invention in which a system has been installed in an automobile.
Figure 5B:
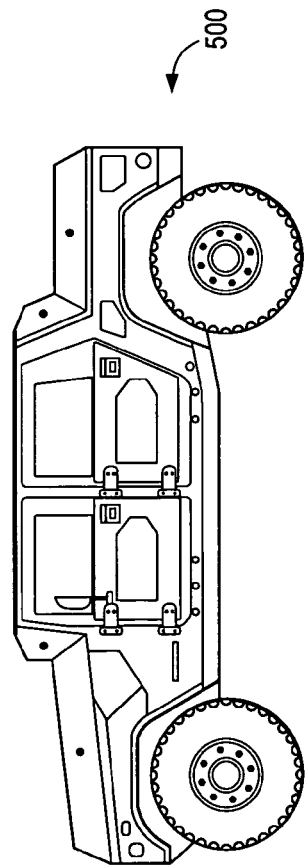
FIG. 5B shows a perspective view of the automobile, in accordance with an embodiment of the present invention.

The method and system of the present invention may be installed in a variety of physical environments. An example of an embodiment in which the present invention is installed in an automobile is shown in FIGS. 5A and 5B. Referring to FIG. 5A, the automobile 500 (which is, in an embodiment, a military vehicle) is equipped with an alternator and a battery 510 that act as a power source 110. The controller microprocessor and current receiver circuit are installed in controller box 520. From the controller box 520, power and bidirectional data are transmitted to the rear accessory bus 530 on a set of wires, which may, for example, control the tail lights 540 or other actuators (or sensors). Also electrically connected to the controller box 520 by a set of wires are gauges 550 and switches 580 (digital and analog sensors), which are installed as loads on one or more nodes within the automobile 500. In addition, a front accessory bus 560 is installed in the automobile 500 for more sensors and actuators—for example, to monitor power and control vehicle accessories such as headlights. In such an embodiment, the rear and front accessory buses 530 and 560 are used to simplify installation and maintenance of the system and are not necessary for the system to be operational, since an electrical connection to the controller box 520 through a set of wires in any mechanical configuration allows power and control of node devices.

Figure 6:
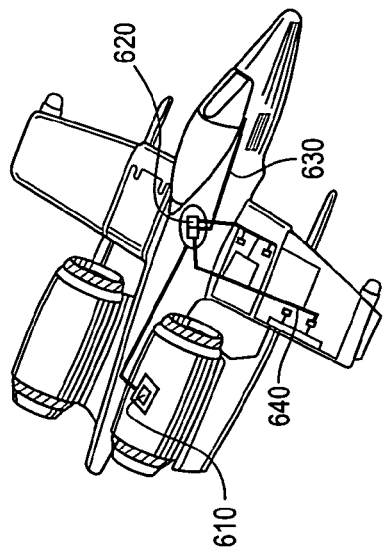
FIG. 6 shows an embodiment of the invention in which a system has been installed in a military aircraft.

In another embodiment, the present invention may be installed in an aircraft, as shown in FIG. 6. The use of the system and method of the present invention improves the robustness, survivability, and ease-of-maintenance of aircraft, such as the military aircraft of FIG. 6.

In military applications, avionics equipment is of primary concern. Damage suffered during combat missions or during electromagnetic countermeasures requires multiply redundant wiring that, ideally, is physically routed through widely separated portions of the aircraft. In practice, these requirements have been extremely difficult because of physical limits on weight and power. Using the present invention, the majority of wires in such an installation is eliminated.

Turning to FIG. 6, in such an embodiment a generator 610 attached to the engine acts as a power source for the system. Power is centralized in a controller assembly 620 and matched with control circuitry from the cockpit 630. From the controller assembly 620, a variety of sensors or actuators 640 are loaded onto nodes connected to a single set of wires in a plurality of locations within the aircraft. Because of the savings in weight and power, each set of wires may be heavily armor-plated, improving the reliability and survivability of aircraft electronics. In addition, since wiring is simpler in number and complexity, maintenance time may be reduced. The present invention may even be used to produce plug-and-play or snap-in modules and electronic components. Simpler maintenance translates into faster training, lower cost, greater theater flexibility, and less depot time. Similar advantages are achieved with nonmilitary aircraft. As much as 80% of the wiring installed in a large aircraft, such as a BOEING 757, might be replaceable by the set of wires used in accordance with the present invention.

Figure 7:
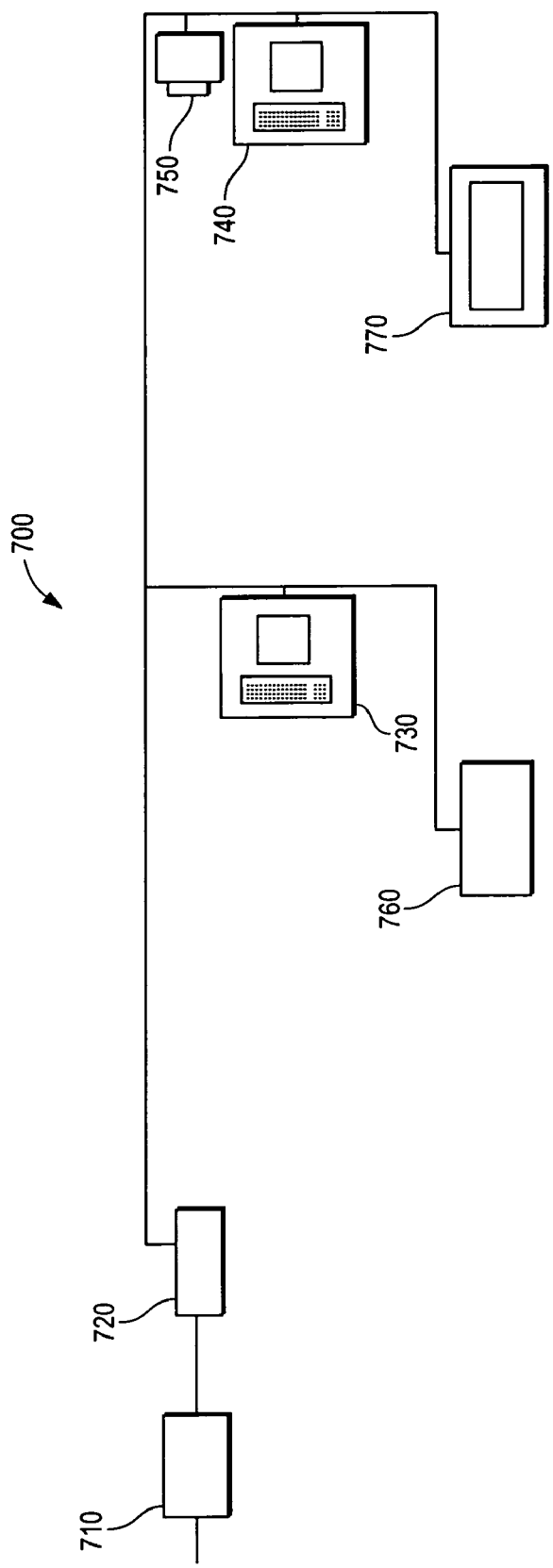
FIG. 7 shows an embodiment of the invention in which a system has been installed in an office building.

In still another embodiment, the present invention is installed in a building, as illustrated in FIG. 7. In such an embodiment, a complete computer network is run from a single power supply 710 and master controller 720. Power is received at a building, for example, in the form of a 120V AC line from a power company. A DC converter or battery 710 converts the power to DC and sends the power to a master controller 720. A single set of wires is pre-installed in the walls of the building, with universal power outlets spaced physically apart at locations throughout the building. The same common set of wires connects all other computers and peripherals to the system 700, including personal computers 730 and 740, personal printers 750, scanners 770, and shared printers 760. The power supply 710 handles both the conversion of AC to DC and emergency power (for example, through a battery).

Most computer equipment operates on a 12V power supply. As a result, using the system and method of the present invention, heavy and expensive voltage converters may be removed from every device connected to the system (power supplies are the most likely to fail of any computer component). In addition, each unit attached to the system has a unique address that allows for it to be distinguished uniquely, allowing more efficient data transfer and security measures impossible with traditional methods for transmitting power and data.

The system 700 is robust for several reasons. First, since the set of wires comprises all the power and data flow needed to operate any connected unit, it may be pre-installed throughout the building, with universal wall plugs allowing for easy installation and movement of components. Second, since all units (or nodes) share a power and data line, nodes can communicate with other nodes by sending messages through the master controller 720 (in addition to normal methods, such as a parallel cable connecting a personal computer 740 and personal printer 750). The system 700 is thus more intelligent and adaptable than alternatives currently available. Third, since power and data are monitored and controlled from the master controller 720, the system is more secure and reliable; it is built to monitor how equipment is used (and, thus, can stop equipment from being used illegally).

FIG. 8 is provided as an example of the pin-out structure for a typical controller or node microprocessor. The microprocessor shown in FIG. 8 is a MOTOROLA 68HC908 series KX8 microprocessor, and FIG. 8 indicates how the pins of the microprocessor are to be connected to battery ground, +P, +N, −P, −N, +5 V, Rx, and Tx, in accordance with embodiments of the present invention.

The use of the terms "a," "an," and "the," and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The specific impedance values given for circuit components in exemplary embodiments of the present invention in particular should not be construed as limitations on the scope of the present invention, since those of skill in the art are familiar with various alternative embodiments in which a specific impedance value might be modified or eliminated from an electronic circuit. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A driver that is connected to a DC power source, a microprocessor and a node in a bidirectional power and data transmission system, the driver comprising:
    a control interface for receiving voltage control signals from the microprocessor;
    an input/output interface for communicating with the node; and
    a transistor bridge connected to the control interface and the input/output interface and connected in parallel with the DC power source, wherein the transistor bridge switches a voltage polarity on the input/output interface in response to the voltage control signals.

2. The driver of claim 1 wherein the control interface comprises a wire that electrically connects the microprocessor to the transistor bridge.

3. The driver of claim 1 wherein the control interface comprises a plurality of wires that electrically connect the microprocessor to the transistor bridge.

4. The driver of claim 1 wherein the transistor bridge comprises MOSFETs.

5. The driver of claim 1 wherein the transistor bridge comprises BJTs.

6. The driver of claim 1 further comprising a circuit module electrically connected in series between the control interface and the transistor bridge for conditioning the voltage control signal, wherein the circuit module includes at least one of a level transfer device, a buffer and a bridge driver.

7. The driver of claim 6 wherein the level transfer device comprises a switch.

8. The driver of claim 6 wherein the circuit module further comprises a complementary MOSFET emitter follower buffer interposed between the bridge driver and the transistor bridge.

9. The driver of claim 1 further comprising a protection means to prevent the transistor bridge from short-circuiting the DC power supply.

10. The driver of claim 9 wherein the protection means comprises an executable software code running on the microprocessor that inhibits the microprocessor from driving the transistor bridge such that two series-interconnected transistors of the transistor bridge are conducting simultaneously.

11. The driver of claim 9 wherein the protection means comprises a circuit block that is connected to a pair of series-interconnected transistors of the transistor bridge to make a relative difference between a turn-on time of a first transistor of the pair and a turn-off time of a second transistor of the pair equal to about three orders of magnitude.

12. The driver of claim 11 wherein the circuit block comprises:
    a resistor that is connected between the gate of the first transistor of the pair and the gate of the second transistor of the pair, wherein the resistor is configured to increase a time constant of the second transistor; and
    a capacitor that is connected to the gate of the second transistor of the pair, wherein the capacitor is configured to be approximately equal to a difference in input capacitance between the first and second transistors of the pair.

13. The driver of claim 12 wherein the resistor is about 100 ohms and the capacitor is about 9 nF.

14. A circuit module for preventing a transistor bridge from short-circuiting a DC power source connected across the transistor bridge, the circuit module comprising:
    a resistor connected between the gate of a first transistor of the transistor bridge and the gate of a second transistor of the transistor bridge; and
    a capacitor connected between the gate and the source of the second transistor of the transistor bridge,
    wherein the resistor and capacitor are selected so that a relative difference between a turn-on time of the first transistor of the pair and a turn-off time of the second transistor of the pair is equal to about three orders of magnitude.

15. The circuit module of claim 14 further comprising:
    a n-channel MOSFET having a drain that is connected with the gate of the first transistor of the transistor bridge; and
    a p-channel MOSFET having a gate that is connected with a gate of the n-channel MOSFET, a source that is connected with the source of the second transistor of the transistor bridge and a drain that is connected with the gate of the second transistor of the transistor bridge.

16. The circuit module of claim 14 wherein the capacitor is configured to be approximately equal to a difference in input capacitance between the first and second transistors of the pair.

17. The circuit module of claim 14 wherein the resistor is about 100 ohms.

18. A method for preventing short circuiting of a power supply across a pair of transistors in a transistor bridge, the method comprising the steps of:
- determining the input capacitance of a first transistor of the pair;
- determining the input capacitance of a second transistor of the pair;
- providing a capacitor that is approximately equal to the difference between the input capacitances of the first and second transistors;
- connecting the capacitor to the gate of the second transistor;
- determining an RC time constant for the first transistor;
- selecting a resistor to provide an RC time constant for the second transistor that is substantially greater than the RC time constant for the first transistor; and
- connecting the resistor between the gate of the second transistor and the gate of the first transistor.

19. The method of claim 18, wherein, in the selecting step, the resistor is selected so that the RC time constant for the second transistor and the RC time constant for the first transistor differ by a factor of about three order of magnitude.

20. The method of claim 18 wherein the resistor is about 100 ohms.

* * * * *